United States Patent
Xiong et al.

(10) Patent No.: US 11,121,828 B2
(45) Date of Patent: Sep. 14, 2021

(54) RADIO (NR) PHYSICAL UPLINK STRUCTURES AND SCHEMES

(71) Applicant: Apple Inc., Cupertino, CA (US)

(72) Inventors: Gang Xiong, Portland, OR (US); Joonyoung Cho, Portland, OR (US); Lopamudra Kundu, Santa Clara, CA (US); Yongjun Kwak, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/478,224

(22) PCT Filed: May 3, 2018

(86) PCT No.: PCT/US2018/030842
§ 371 (c)(1),
(2) Date: Jul. 16, 2019

(87) PCT Pub. No.: WO2018/204610
PCT Pub. Date: Nov. 8, 2018

(65) Prior Publication Data
US 2020/0052835 A1    Feb. 13, 2020

Related U.S. Application Data

(60) Provisional application No. 62/501,652, filed on May 4, 2017, provisional application No. 62/501,549, filed on May 4, 2017.

(51) Int. Cl.
*H04L 1/18* (2006.01)
*H04B 7/0456* (2017.01)
(Continued)

(52) U.S. Cl.
CPC ......... *H04L 1/1861* (2013.01); *H04B 7/0486* (2013.01); *H04B 7/0632* (2013.01);
(Continued)

(58) Field of Classification Search
CPC ... H04L 1/1861; H04L 1/0013; H04L 1/1819; H04L 5/0007; H04L 5/0051;
(Continued)

(56) References Cited

U.S. PATENT DOCUMENTS

2014/0286255 A1\*  9/2014  Nam ................... H04L 27/2613
370/329
2015/0201383 A1\*  7/2015  Papasakellariou .. H04W 52/146
370/278
(Continued)

FOREIGN PATENT DOCUMENTS

WO    2018128870 A2    7/2018

OTHER PUBLICATIONS

International Preliminary Report on Patentability dated Nov. 5, 2019 for International Application No. PCT/US2018/030842.
(Continued)

*Primary Examiner* — Alex Skripnikov
*Assistant Examiner* — Sharmin Chowdhury
(74) *Attorney, Agent, or Firm* — Eschweiler & Potashnik, LLC

(57) ABSTRACT

New radio (NR) Uplink (UL) transmissions in an NR physical UL channel can be configured for a user equipment (UE) to communicate with a base station (e.g., gNB). The structures and mechanisms for configured these communications different from long term evolution (LTE) in NR specifications. A UE can generate a UL transmission with symbols on the NR physical channel including demodulation-reference signal (DM-RS) symbols and uplink control information (UCI) symbols. The UL transmissions comprise
(Continued)

a DM-RS symbol located at each first symbol with variable lengths. The UE generates the UL transmission as an NR physical UL channel with about a 50% DM-RS overhead with a same or more DM-RS symbols than UCI symbols in a sequential pattern (e.g., an alternating pattern). The UE further maps HARQ-ACK feedback on a PUSCH based a frequency first operation that initiates following the DM-RS symbol located at the first symbol.

23 Claims, 28 Drawing Sheets

(51) Int. Cl.
*H04B 7/06* (2006.01)
*H04L 1/00* (2006.01)
*H04L 5/00* (2006.01)
*H04L 5/10* (2006.01)

(52) U.S. Cl.
CPC ......... *H04B 7/0639* (2013.01); *H04L 1/0013* (2013.01); *H04L 1/1819* (2013.01); *H04L 5/0007* (2013.01); *H04L 5/0051* (2013.01); *H04L 5/0055* (2013.01); *H04L 5/10* (2013.01)

(58) Field of Classification Search
CPC ....... H04L 5/0055; H04L 5/10; H04L 5/0091; H04B 7/0486; H04B 7/0632; H04B 7/0639
See application file for complete search history.

(56) References Cited

U.S. PATENT DOCUMENTS

| | | | |
|---|---|---|---|
| 2018/0132269 A1* | 5/2018 | Wang | H04W 72/1284 |
| 2019/0199477 A1* | 6/2019 | Park | H04L 1/0067 |
| 2019/0357206 A1* | 11/2019 | Xu | H04W 72/0413 |
| 2020/0059332 A1* | 2/2020 | Takeda | H04W 72/044 |
| 2020/0195387 A1* | 6/2020 | Matsumura | H04W 72/04 |

OTHER PUBLICATIONS

International Search Report dated Nov. 7, 2018 for International Application No. PCT/US2018/030842.
"Design of long NR-PUCCH format." Source: LG Electronics. Agenda Item: 8.1.3.2.2. 3GPP TSG RAN WG1 Meeting #88bis, Spokane, USA Apr. 3-7, 2017. R1-1704909.
"Design of NR PUCCH with long duration." Source: Guangdong OPPO Mobile Telecom. Agenda Item: 8.1.3.2.2. 3GPP TSG RAN WG1 meeting #88 bis, Spokane, Washington, USA Apr. 3-7, 2017. R1-1704624.
"Designs for PUCCH in long duration." Source: NTT Docomo, Inc. Agenda Item: 8.1.3.2.2. 3GPP TSG RAN WG1 Meeting #88, Athens, Greece, Feb. 13-17, 2017. RI-1702812.
"UL control channel structure in long duration." Source: NTT Docomo, Inc. Agenda Item: 5.1.3.2. 3GPP TSG RAN WG1 AH-NR Meeting, Spokane, USA Jan. 16-20, 2017. R1-1700623.

* cited by examiner

RADIO (NR) PHYSICAL UPLINK STRUCTURES AND SCHEMES

REFERENCE TO RELATED APPLICATIONS

This application is a National Phase entry application of International Patent Application No. PCT/US2018/030842 filed May 3, 2018, which claims priority to U.S. Provisional Application Nos. 62/501,652 filed May 4, 2017, entitled "NEW RADIO LONG PHYSICAL UPLINK CONTROL CHANNEL STRUCTURE", and the benefit of U.S. Provisional Application No. 62/501,549 filed May 4, 2017, entitled "MULTIPLEXING SCHEME FOR UPLINK CONTROL INFORMATION ON PHYSICAL UPLINK SHARED CHANNEL FOR NEW RADIO SYSTEMS", in the name of Gang Xiang et al. and is hereby incorporated by reference in its entirety.

FIELD

The present disclosure relates to wireless technology and more specifically to structures and schemes of uplink (UL) transmissions for new radio (NR).

BACKGROUND

Wireless mobile communication technology uses various standards and protocols to transmit data between a node (e.g., a transmission station) and a wireless device (e.g., a mobile device), or a user equipment (UE). Some wireless devices communicate using orthogonal frequency-division multiple access (OFDMA) in a downlink (DL) transmission and single carrier frequency division multiple access (SC-FDMA) in an uplink (UL) transmission, for example. In 3GPP radio access network (RAN) LTE systems, the node can be an Evolved Universal Terrestrial Radio Access Network (E-UTRAN) Node B (also commonly denoted as evolved Node Bs, enhanced Node Bs, eNodeBs, or eNBs) as well as one or more Radio Network Controllers (RNCs), which communicate with the UE. The DL transmission can be a communication from the node (e.g., eNB) to the UE, and the UL transmission can be a communication from the wireless device to the node. In LTE, the eNodeB transmits data to the UE via a physical downlink shared channel (PDSCH). A physical UL control channel (PUCCH) then acknowledges reception of the data.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometimes conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable ubiquitous connected by wireless and deliver fast, rich contents and services.

In NR, uplink control information (UCI) on physical uplink shared channel (PUSCH) is supported in addition to simultaneous physical uplink control channel (PUCCH) and PUSCH transmission. The main motivation is that UCI is used for providing the scheduler and the HARQ protocol with information about the condition at UE. Typically it requires more robust performance than data channel. In the case when the UCI payload size is large, it may be carried in PUSCH to improve the link budget.

Similar to the LTE specification, uplink control information (UCI) may include HARQ ACK/NACK feedback and/or channel state information (CSI) report, e.g., channel quality indicator (CQI), pre-coding matrix indicator (PMI) and rank indicator (RI). For cmWave and mmWave band, UCI may also include beam related information.

DETAILED DESCRIPTION

Figure 1:
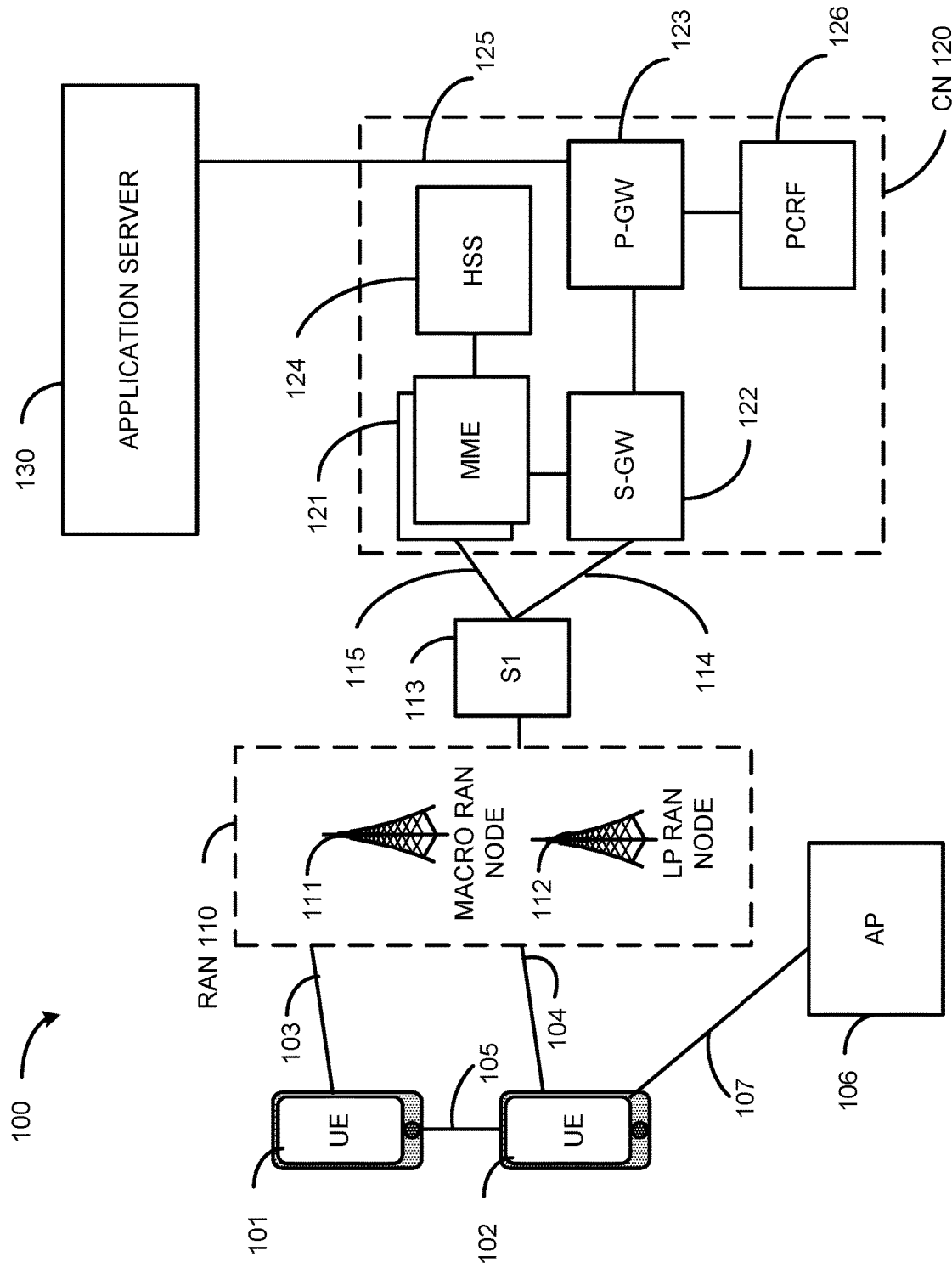
FIG. 1 is a block diagram illustrating example user equipments (UEs) useable in connection with various network components according to various aspects (embodiments) described herein.

The present disclosure is described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (UE) (e.g., mobile/wireless phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising."

OVERVIEW

In consideration of the above described deficiencies, various components, mechanisms, acts and techniques are disclosed that enable network devices (e.g., new radio eNBs or gNBs) to schedule or enable other network devices (e.g., UEs) with fixed or dynamic structures to efficiently operate with NR specifications compatible with 3GPP NR standards as disclosed in TS. 38.211. In order to ensure compatibility in unified and efficiently powered communication operations between the UE and gNB, channel structures and communication operations are introduced in various aspects/embodiments herein, which can further improve channel estimation quality and detection performance of the communications.

According to various aspects/embodiments herein for NR network devices and communications, an NR physical UL channel can have a dynamically variable duration or length from 4 symbols to 14 symbols. The duration of each UL transmission can change dynamically among different UL transmissions (or transmission slots) based on a control indication on a DL control channel or PDCCH to indicate a different number of symbols, different symbol locations, configurations, mapping, or other UL transmission characteristic. The gNB or other network component can signal an indication via DL control channel, higher layer signaling such as radio resource control (RRC) or the like. This indication, for example, can indicate a duration of a long NR PUCCH to enable the UE to generate UL transmission on NR PUCCH.

Further, depending on the duration of the control channel, the UE can operate to configure a number of DM-RS symbols and DM-RS locations differently in order to optimize performance. By dynamically varying DM-RS structures based on the number of symbols and their locations enables the UE to provide an optimal performance for the NR base station (gNB) to detect the signal and perform channel estimation from the demodulation of the signal, thereby providing an optimal uniformity and continuity with the greatest efficiency for NR communication.

In one embodiment, the UE can generate the UL transmission with a sequential pattern with symbols carrying DM-RS (DM-RS symbols) and symbols carrying uplink control information (UCI) (UCI symbols). For example, the sequential pattern can include an alternating pattern alternating between one DM-RS symbol and one UCI symbol within an NR transmission, transmission unit, or slot. For example, if the length or duration of the NR PUCCH is seven symbols based on an indication received or one or more other criteria, the first, third, fifth, and seventh symbols can be configured as DM-RS symbols, and the second, fourth, and sixth symbols as UCI symbols within a long NR PUCCH.

Additionally, the UE can be configured to generate a front loaded DM-RS pattern so the DM-RS can be transmitted at the beginning of data in PUSCH or a long NR PUCCH, allowing for faster decoding at the gNB receiver.

In other aspects, various multiplexing schemes and frequency hopping operations for UCI on PUSCH are further utilized for the NR UL transmissions. The UCI can carry hybrid automatic repeat hybrid automatic repeat request-acknowledgement (HARQ-ACK) feedback with the channel state information (CSI) report, where the CSI report may also include channel quality indicator (CQI), a precoding matrix indicator (PMI) and rank indicator (RI). If the UE is transmitting the PUCCH, which carries UCI and the PUSCH carrying data at the same time, collisions can occur, and thus, for further improvement in channel quality and estimation by the gNB, the UE can multiplex the UCI with resource data on PUSCH.

In an aspect for NR communications, the UE can enable a low latency decoding by generating the NR physical UL channel (e.g., PUCCH, PUSCH, or the like) with a frequency first and time second mapping for symbols on PUSCH, or a time first mapping and then a frequency second mapping.

Additional aspects and details of the disclosure are further described below with reference to figures.

Embodiments/aspects described herein can be implemented into a system/apparatus using any suitably configured hardware or software. FIG. 1 illustrates an architecture of a system 100 of a network in accordance with some embodiments for generating UL communications according to the device components/circuits described herein. The system 100 is shown to include a user equipment (UE) 101 and a UE 102. The UEs 101 and 102, which can be NR UEs operable for configuring NR communications in UL via an NR physical UL channel (e.g., a PUCCH, PUCCH, or the like) are illustrated as smartphones (e.g., handheld touchscreen mobile computing devices connectable to one or more cellular networks), but can also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE (or IoT device), which can comprise a network access layer designed for low-power IoT applications utilizing short-lived UE connections, and can be distinguished from cellular UEs or wireless cell devices alone as low power network devices as eMTC or NB-IoT UEs utilizing a low power network, for example, or MulteFire standards for communication. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 and 102 can be configured to connect, e.g., communicatively couple, with a radio access network (RAN) 110—the RAN 110 can be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 can further directly exchange communication data via a ProSe interface 105. The ProSe interface 105 can alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes (or RAN nodes) that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 can include one or more RAN nodes for providing macrocells (e.g., macro RAN node 111), and one or more RAN nodes for providing femtocells, picocells, or network cells having smaller coverage areas, smaller user capacity, or higher bandwidth compared to macrocells (e.g., low power (LP) RAN node 112).

Any of the RAN nodes 111 and 112 can terminate the air interface protocol and can be the first point of contact for the UEs 101 and 102. In some embodiments, any of the RAN nodes 111 and 112 can fulfil various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

The physical downlink shared channel (PDSCH) can carry user data and higher-layer signaling to the UEs 101 and 102. The physical downlink control channel (PDCCH) can carry information about the transport format and resource allocations related to the PDSCH channel, among other things. It can also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) can be performed at any of the RAN nodes 111 and 112 based on channel quality information fed back from any of the UEs 101 and 102. The downlink resource assignment information can be sent on the PDCCH used for (e.g., assigned to) each of the UEs 101 and 102.

The PDCCH can use control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as resource element groups (REGs). Four Quadrature Phase Shift Keying (QPSK) symbols can be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an enhanced physical downlink control channel (EPDCCH) that uses PDSCH resources for control information transmission. The EPDCCH can be transmitted using one or more enhanced the control channel elements (ECCEs). Similar to above, each ECCE can correspond to nine sets of four physical resource elements known as an enhanced resource element groups (EREGs). An ECCE can have other numbers of EREGs in some situations.

The RAN 110 is shown to be communicatively coupled to a core network (CN) 120—via an S1 interface 113. In embodiments, the CN 120 can be an evolved packet core (EPC) network, a NextGen Packet Core (NPC) network, or some other type of CN. In this embodiment the S1 interface 113 can be split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 can be similar in function to the control plane of legacy Serving General Packet Radio Service (GPRS) Support Nodes (SGSN). The MMEs 121 can manage mobility aspects in access such as gateway selection and tracking area list management. The HSS 124 can comprise a database for network users, including subscription-related information to support the network entities' handling of communication sessions. The CN 120 can comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 can terminate the S1 interface 113 towards the RAN 110, and routes data packets between the RAN 110 and the CN 120. In addition, the S-GW 122 can be a local mobility anchor point for inter-RAN node handovers and also can provide an anchor for inter-3GPP mobility. Other responsibilities can include lawful intercept, charging, and some policy enforcement.

The P-GW 123 can terminate an SGi interface toward a PDN. The P-GW 123 can route data packets between the EPC network 123 and external networks such as a network including the application server 130 (alternatively referred to as application function (AF)) via an Internet Protocol (IP) interface 125. Generally, the application server 130 can be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 can further be a node for policy enforcement and charging data collection. Policy and Charging Enforcement Function (PCRF) 126 is the policy and charging control element of the CN 120. In a non-roaming scenario, there can be a single PCRF in the Home Public Land Mobile Network (HPLMN) associated with a UE's Internet Protocol Connectivity Access Network (IP-CAN) session. In a roaming scenario with local breakout of traffic, there can be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 can be communicatively coupled to the application server 130 via the P-GW 123. The application server 130 can signal the PCRF 126 to indicate a new service flow and select the appropriate Quality of Service (QoS) and charging parameters. The PCRF 126 can provision this rule into a Policy and Charging Enforcement Function (PCEF) (not shown) with the appropriate traffic flow template (TFT) and QoS class identifier (QCI), which commences the QoS and charging as specified by the application server 130.

Figure 2:
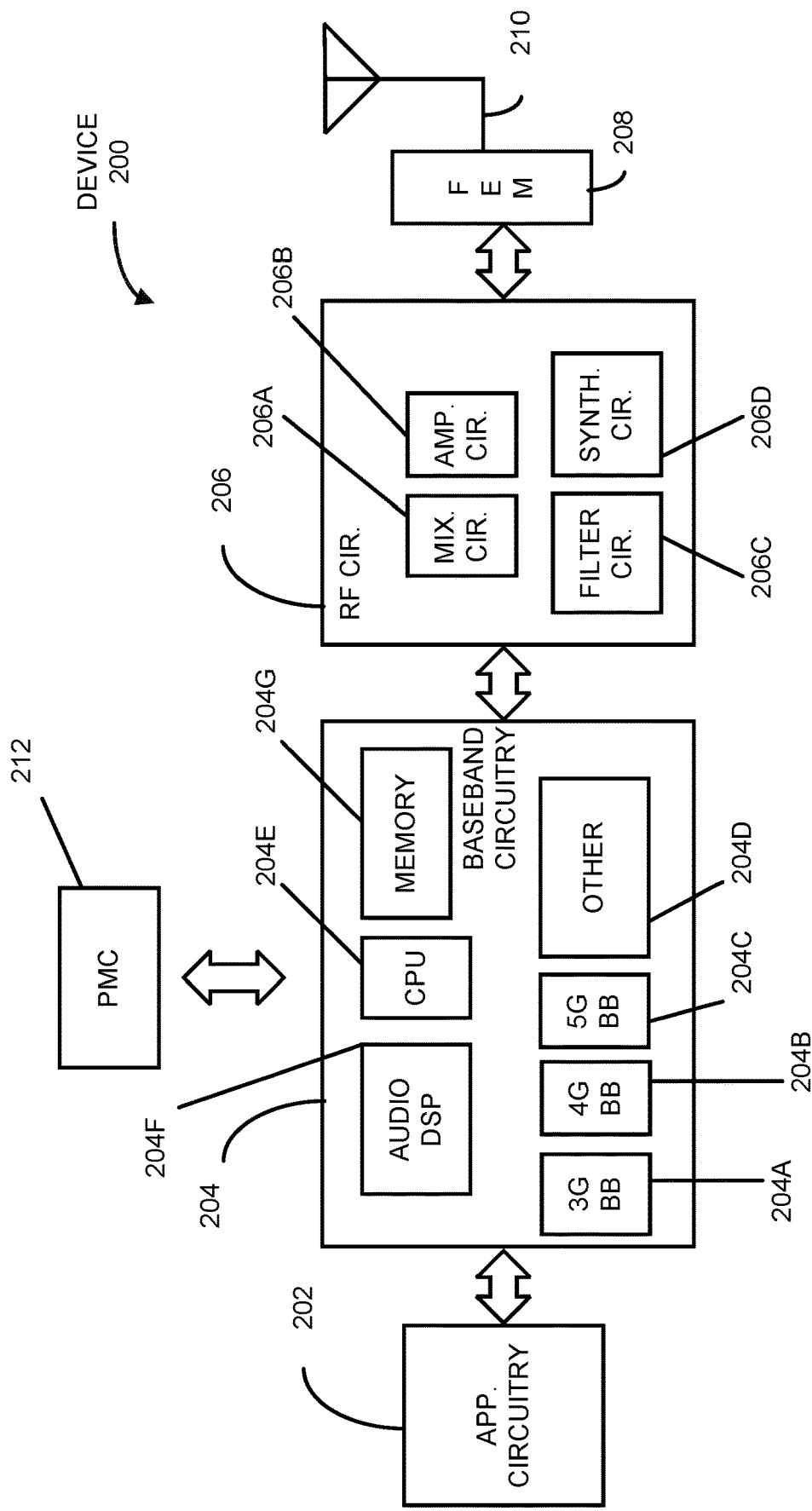
FIG. 2 is a diagram illustrating example components of a device that can be employed in accordance with various aspects discussed herein.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a gNB, eNB, UE (e.g., 101 or 102), a RAN node or other network device (e.g., 111 or 112) incorporating one or more various aspects/embodiments herein. In some embodiments, the device 200 can include less elements (e.g., a RAN node could not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuity 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tailbiting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for superheterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

FIG. 2 illustrates the PMC 212 coupled only with the baseband circuitry 204; however, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 could not receive data in this state, and in order to receive data, it must transition back to RRC_Connected state.

An additional power saving mode can allow a device to be unavailable to the network for periods longer than a paging interval (ranging from seconds to a few hours). During this time, the device is totally unreachable to the network and can power down completely. Any data sent during this time incurs a large delay and it is assumed the delay is acceptable.

Processors of the application circuitry 202 and processors of the baseband circuitry 204 can be used to execute elements of one or more instances of a protocol stack. For example, processors of the baseband circuitry 204, alone or in combination, can be used execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
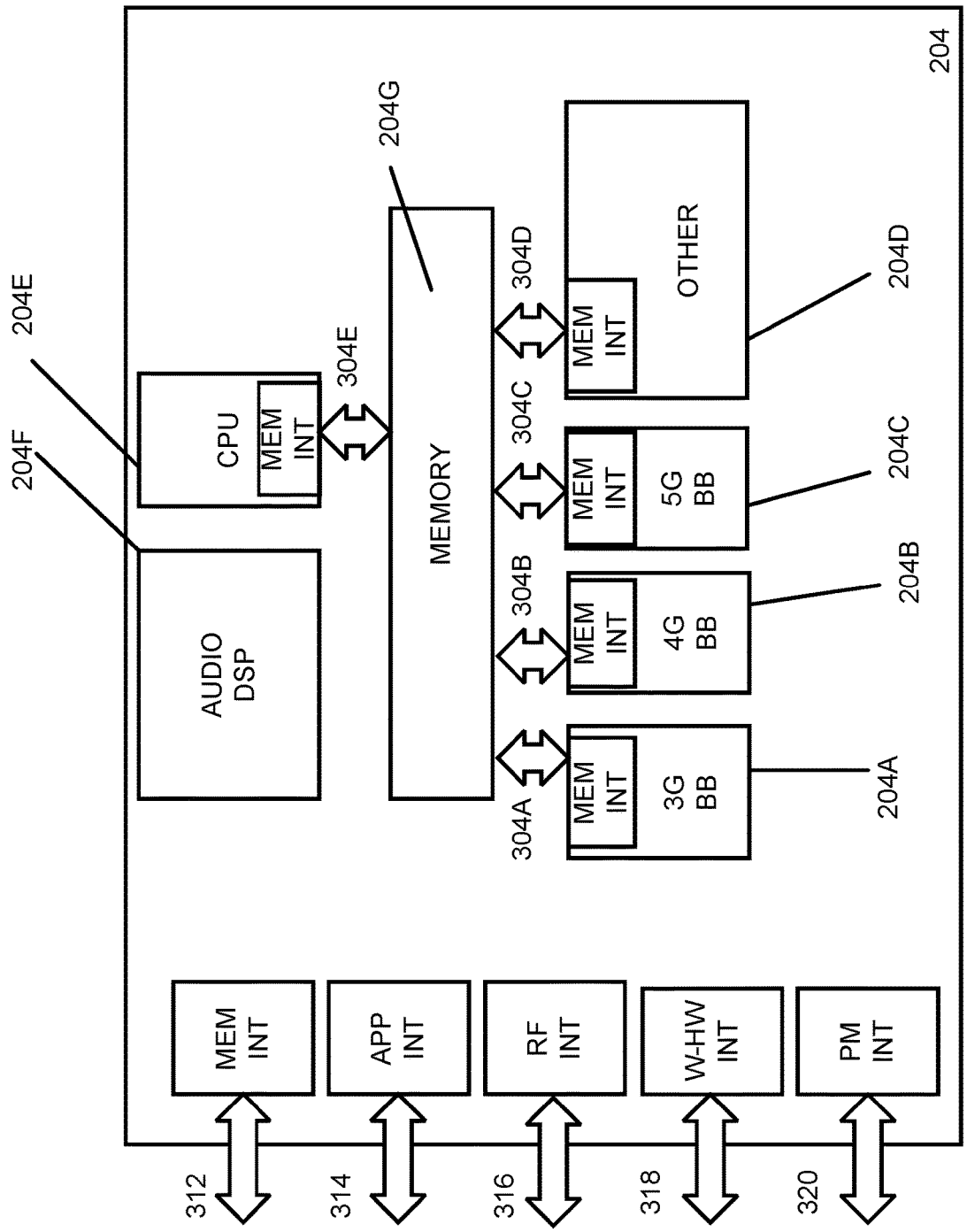
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 can comprise processors 204A-204E and a memory 204G utilized by said processors. Each of the processors 204A-204E can include a memory interface, 304A-304E, respectively, to send/receive data to/from the memory 204G.

In addition, the memory 204G (as well as other memory components discussed herein, such as memory 430, memory 530 or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

The baseband circuitry 204 can further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

Figure 4:
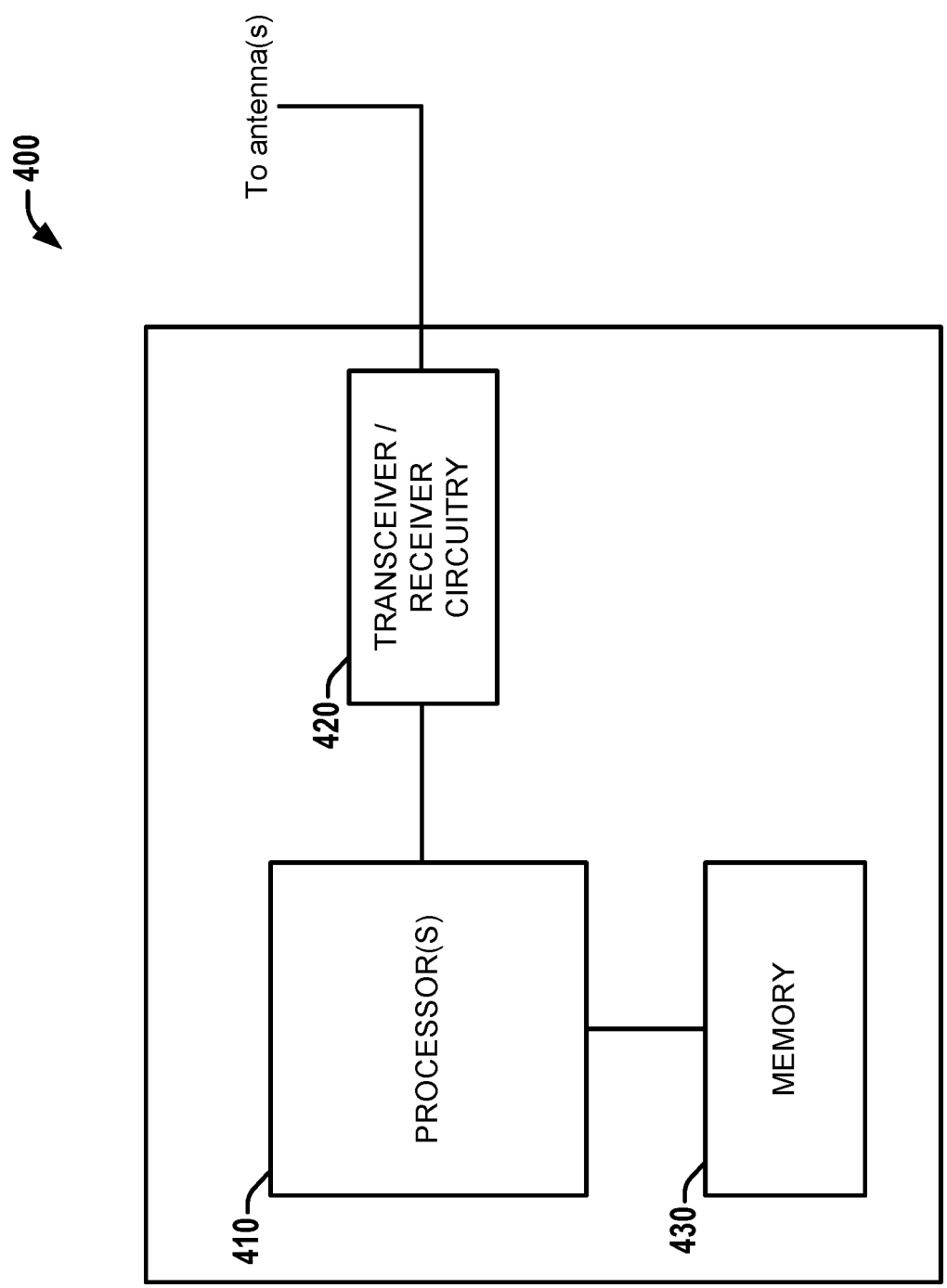
FIG. 4 is a block diagram illustrating a system employable at a UE that enables UL communications according to various aspects/embodiments described herein according to various aspects described herein.

Referring to FIG. 4, illustrated is a block diagram of a system or apparatus 400 employable at a user equipment (UE) or IoT device (e.g., UE 101 or 102) that can enable autonomous UL transmissions according to various aspects/embodiments described herein. System 400 can include one or more processors 410 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), transceiver circuitry 420 (e.g., comprising one or more of transmitter circuitry or receiver circuitry, which can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE) or IoT device, for example, a MTC/IoT UE.

In various aspects discussed herein, signals and/or messages can be generated and output for transmission, and/or transmitted messages can be received and processed. Depending on the type of signal or message generated, outputting for transmission (e.g., by processor(s) 410, processor(s) 510 of FIG. 5, etc.) can comprise one or more of the following: generating a set of associated bits that indicate the content of the signal or message, coding (e.g., which can include adding a cyclic redundancy check (CRC) and/or coding via one or more of turbo code, low density parity-check (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor(s) 510, etc.) can comprise one or more of: identifying physical resources associated with the signal/message, detecting the signal/message, resource element group deinterleaving, demodulation, descrambling, or decoding.

In some embodiments, the system 400 as a UE device can perform communications for a fifth generation (5G) or new radio NR system, comprising by generating and transmitting a new radio (NR) long physical UL control channel (PUCCH) comprising a sequence of symbols in a sequential pattern based on DM-RS symbols and UCI symbols. Each sequential pattern can depend on one or more building blocks, as a pattern of DM-RS and UCI symbols.

For example, one building block can comprise two symbols, one DM-RS symbol and one UCI symbol. Alternatively, or additionally, the UE 400 can process via the processor 410 another building block comprising three symbols, two DM-RS symbols and one UCI symbol. The length or duration of the NR PUCCH (e.g., a long NR PUCCH of the PUCCH) can vary from about four symbols to about 14 symbols based on these smallest scalable symbol units or building blocks, as the two symbol sequential pattern structure (one DM-RS and one UCI) and the three symbol sequential pattern structure (two DM-RS and one UCI). Thus, for example, a UL transmission or long PUCCH with a length of seven symbols can be generated by the UE with two of the two symbol sequential pattern/building block symbol structures, and one with three concatenated together.

Any of the lengths, number and locations of the various symbols on an NR PUCCH can initiate with a front end DM-RS symbol. The sequential patterns for each length therefore can comprise an alternating pattern that alternates in time from the first symbol being a DM-RS symbol, the second symbol being a UCI symbol, the third a DM-RS symbol and so forth across the total length of the UL transmission or slot.

In some aspects, in particular where the duration/length is an even number of symbols, a DM-RS symbol can be located at the start and a UCI symbol located at the end/last symbol. PUCCH of even lengths, for example, can be generated or structured by the UE 400 by repetitions of the building block consisting of two symbols.

In UL transmissions with an odd number in length or duration, DM-RS symbols can be located at the start and end of the building block or transmission slot, and in alternating fashion with UCI symbols there-between. For the three symbol building block, for example, a UCI symbol can thus be located in the middle. For PUCCH of odd lengths, the UE 400 can concatenated one or more of a building block consisting of two symbols and another building block consisting of three symbols, for example.

In other aspects, the UE 400 can operate to receive (via gNB 500 of FIG. 5) an indication in uplink grant for an uplink control information (UCI) on physical uplink shared channel (PUSCH). Based on the indication, the UE 400 configured the UCI on a PUSCH for transmission. The UE 400 can further configure or encode Hybrid automatic repeat request-acknowledgement (HARQ-ACK) symbols by mapping it in a frequency first manner, starting from the first symbol after one or more DM-RS symbols.

A frequency first manner/operation as referred to herein can refer to mapping symbols carrying data or bits, DM-RS, UCI, data of a CSI report, or the like, according to frequency or along a frequency allocated spectrum/resource associated with a UL transmission, which can be performed before mapping along a time domain one or more other symbols or UCI, for example. Similarly, a time first manner/operation can refer to mapping symbols carry data or bits along a time sequence first within a transmission/slot before then subsequently mapping along the allocated frequency resources/spectrum for the transmission (e.g., a UL transmission).

Additionally, or alternatively, the encoded HARQ-ACK symbols can be mapped in a time first manner.

In an aspect, the UE 400 can receive an indication of whether a time-first or a frequency-first mapping is employed for HARQ-ACK feedback on PUSCH resource, either semi-statically as configured by higher layers via NR minimum system information (MSI), NR remaining minimum system information (RMSI), NR system information block (SIB), or radio resource control (RRC) signalling, or dynamically indicated in the downlink control information (DCI), for example. HARQ-ACK feedback can be mapped in a distributed manner, in which chunks of the HARQ-ACK feedback or other CSI report/UCI/data can be mapped to the UL transmission or transmission slot intermittently or discontinuously with multiple segments along the allocated resource (frequency, time or the like). Additionally, or alternately, the HARQ-ACK feedback can be transmitted in the same subcarrier with the associated DM-RS antenna ports (AP) for PUSCH transmission.

In another aspect, the indication of whether a time-first or a frequency-first mapping is employed for HARQ-ACK feedback on PUSCH resource can be provided or determined based on different waveforms, or can be associated with one particular waveform used (e.g., Cyclic Prefix Orthogonal Frequency-Division Multiplexing (CP-OFDM), Discrete Fourier Transform spread OFDM (DFT-s-OFDM), or the like).

In another aspect, the number of subcarriers in frequency, or the number of symbols used for the transmission of HARQ-ACK symbols on PUSCH can be derived from the rate-matching parameters or configured by higher layers.

A channel quality indicator (CQI), pre-coding matrix indicator (PMI), rank indicator (RI), beam related information, or any combination thereof can further be rate match around the data symbols. In one example, RI can be mapped in a similar manner as HARQ-ACK symbols. Additionally, or alternatively, a same modulation scheme as used for data symbols can be employed for CQI/PMI and beam related information.

The UE 400 can also further map various CSI report information in the UL transmission according to a time first manner or a frequency first manner. For example, the CQI/PMI and beam related information can be mapped in a time first manner. In an aspect, the CQI/PMI and beam related information can be mapped in one side, or both edges of allocated resources for PUSCH.

If in a frequency first manner, for example, CQI/PMI and beam related info could be mapped in the transmission along both extremes or edges of the frequency spectrum for the transmission. For example, the CQI/PMI and beam related information can be mapped in a frequency first manner, starting from the first symbol after DM-RS symbol(s); wherein CQI/PMI and beam related information can be rate-matched around or based on the HARQ-ACK feedback and RI symbols.

In another aspect, when a phase tracking—reference signal (PT-RS) an and additional DM-RS symbol are generated in the slot and when UCI is embedded on PUSCH, the UE 400 can also rate-match UCI around the PT-RS and the additional DM-RS symbol, for example.

Figure 5:
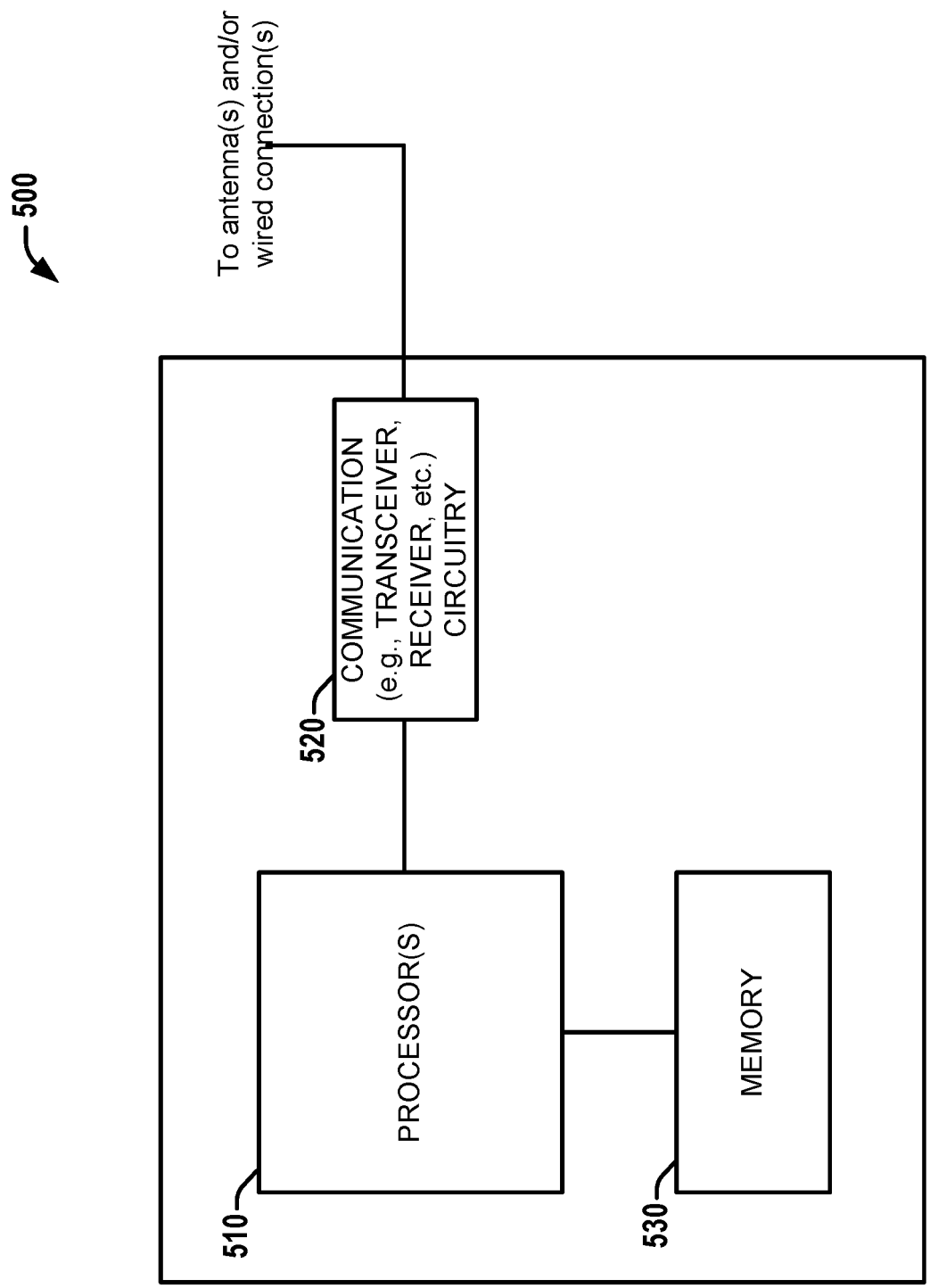
FIG. 5 is a block diagram illustrating a system employable at a base station (BS)/evolved NodeB (eNB)/new radio/next generation NodeB (gNB) that enables UL communications according to various aspects/embodiments described herein, according to various aspects described herein.

Referring to FIG. 5, illustrated is a block diagram of a system or apparatus 500 employable at a BS (Base Station), gNB, eNB or other network device/component (e.g., 111 or 112) that facilitates/enables autonomous UL transmission. System 500 can include one or more processors 510 (e.g., one or more baseband processors such as one or more of the baseband processors discussed in connection with FIG. 2 and/or FIG. 3) comprising processing circuitry and associated memory interface(s) (e.g., memory interface(s) discussed in connection with FIG. 3), communication circuitry 520 (e.g., which can comprise circuitry for one or more wired (e.g., X2, etc.) connections and/or transceiver circuitry that can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station in a wireless communications network. In some aspects, the processor(s) 510, communication circuitry 520, and the memory 530 can be included in a single device, while in other aspects, they can be included in different devices, such as part of a distributed architecture.

In some embodiments or aspects, the gNB 500 can operate to process the UL transmission comprising the OFDM symbols on an NR physical UL channel based on a pattern, such as a sequential pattern that includes one or more DM-RS symbols and one or more UCI symbols. The UL transmission can include a front loaded DMRS pattern where it comprises a DM-RS symbol located at a first symbol (e.g., first OFDM symbol) in the transmission or slot of the transmission. The NR physical UL channel, for example, can comprise a PUCCH, a PUSCH or the like, for example.

The gNB 500 can further operate to process the UL transmission based on frequency hopping among a plurality of frequencies. For example, the gNB 500 can process the UL transmission according to a frequency hopping operation based on a first OFDM symbol set on a first frequency and a second OFDM symbol set on a second frequency of the UL transmission. Each frequency segment or set can be structured in an alternating pattern as the sequence pattern, initiating with the first DM-RS symbol and alternating with a UCI symbol, then a DM-RS symbol and similarly so on, so that the set alternates sequentially between a DM-RS symbol and a UCI symbol.

In one example, the second OFDM symbol set on the second frequency of the UL transmission can be different from the first OFDM symbol set and initiate with a UCI symbol, even if it is the same length or duration in symbols as the first OFDM symbol set on the first frequency. Alternatively, or additionally, the second OFDM set can be a mirror image or the same, in which the second OFDM symbol set initiates or starts with a DM-RS similar to the first OFDM symbol set.

In an aspect, the gNB 500 can provide, via a DL scheduling information or DCI on PDCCH, an indication of a length of a long NR PUCCH to dynamically enable a variation in the length based on one or more criteria (e.g., allocated resource, CSI report, other feedback from the UE 400, or the like).

The gNB 500 can also receive and process HARQ-ACK feedback on a PUSCH based a frequency first mapping that initiates following the DM-RS symbol located at the first OFDM symbol of the symbols for the UL transmission, in which the HARQ-ACK feedback can be dispersed in segments distributed discontinuously across a frequency resource allocated or a time resource, for example.

The gNB 500 can also process an additional DM-RS symbol and a phase tracking-reference signal (PT-RS) within a same slot as the DM-RS symbol located at the first OFDM symbol on the PUSCH, in which a UCI symbol can be rate-matched adjacent to or around the additional DM-RS symbol and the PT-RS.

Figure 6:
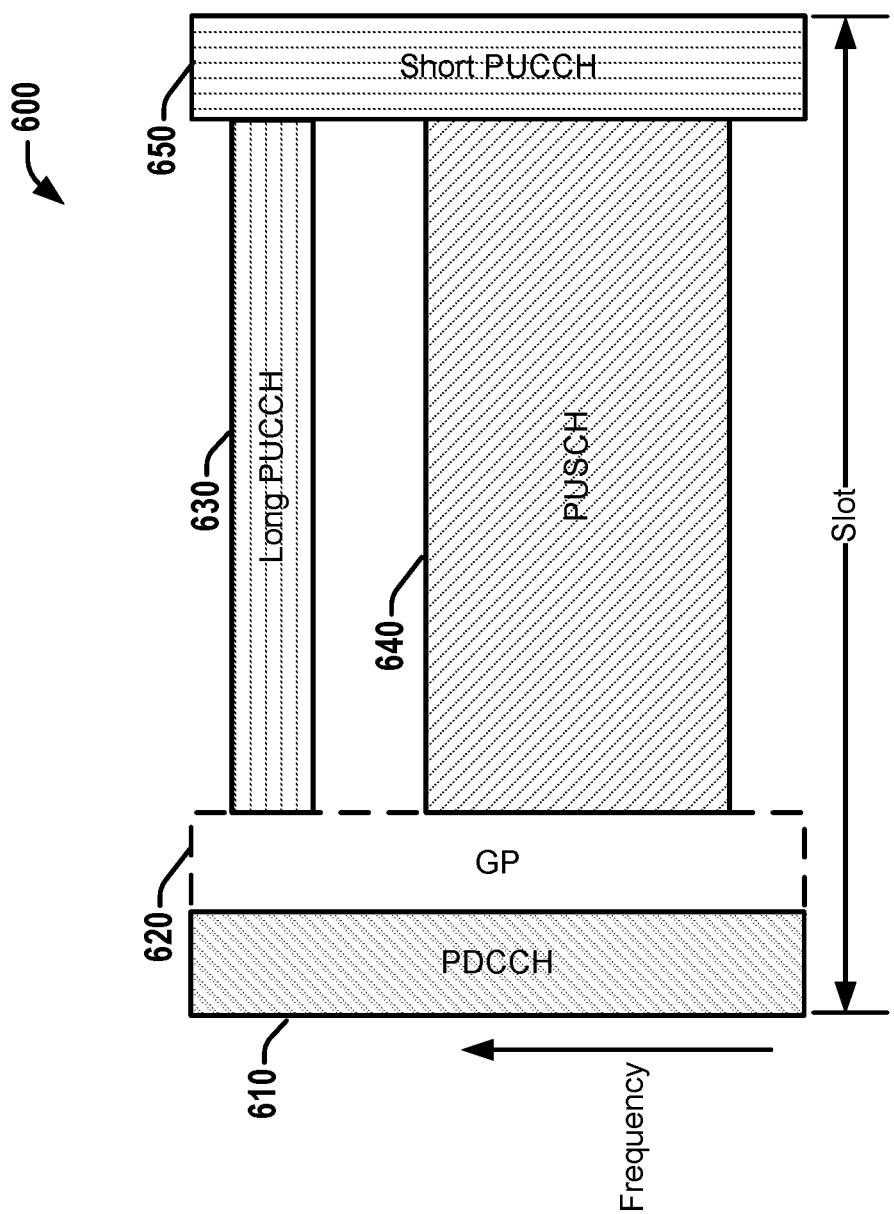
FIG. 6 illustrates an example transmission for UL communications according to various aspects/embodiments described herein.

Referring to FIG. 6, illustrated is an example of an NR physical UL channel with communication transmission 600 comprising a PDCCH 610 across a frequency spectrum of an allocated frequency along a frequency vertical axis, a gap 620, a long NR PUCCH 630, a PUSCH 640, and a short PUCCH 650, in a slot extending along a horizontal time axis. UEs (e.g., UE 400) generate both long and short duration PUCCHs 630, 650 to carry data, UCI, DM-RS, for transmission to NR gNBs (e.g., NR gNB 500). Multiple DFT-s-OFDM or CP-OFDM waveform symbols carrying such data can be allocated for the long PUCCH 630 to improve link budget and uplink coverage for control channel.

Additionally, the long PUCCH 630 can be multiplexed with a UL data channel or the PUSCH 640 in a frequency division multiplexing (FDM) manner. The short PUCCH 650 can be multiplexed (e.g., by the UE 400, or other communicating network device) with PUSCH 640 in a time division multiplexing (TDM) manner and employ one or two symbols, in contrast to the long NR PUCCH 630. In order to accommodate the D-to-UL and UL-to-DL switching time and round-trip propagation delay, a guard period (GP) 620 can be inserted between the NR physical downlink control channel (NR PDCCH) 610 and the PUSCH 640.

A difference between legacy 3GPP long term evolution (LTE) physical UL control channel (e.g., PUCCH, or the like) and the NR PUCCH is that in LTE the duration/length of the UL transmission in terms of number of symbols of the UL control channel structure is fixed (e.g., 13 to 14 symbols for LTE PUCCH), while the UE 400 can dynamically and variably configure the length of the NR PUCCH (e.g., the long NR PUCCH 630). For example, the LTE UL control channel structure can have 13 or 14 symbols, while the duration of the NR PUCCH such as the long NR PUCCH 630 can be configured from four (4) to fourteen (14) symbols for different transmissions. As such, according to one embodiment, the UE 400 is configured to change the duration dynamically, which can be determined by the gNB 500 scheduling information (e.g., control data on the PDCCH) or an indication of the duration as provided by the gNB 500, for example, semi-statically or dynamically.

In an aspect, the UE 400 can dynamically configure the number of DM-RS symbols and their location within a physical UL channel (e.g., the long NR PUCCH) of the transmission 600, which can be different in number or location between different physical UL channels (or long NR PUCCHs) of transmissions in order to optimize the performance. As such, the UE 400 can generate/transmit, or gNB 500 process/receive a dynamic DM-RS structure of an NR physical UL control channel based on a varying number of symbols and their locations among transmissions or different slots of transmissions to provide the optimal performance for the gNB 500 to detect it by performing channel estimation from the demodulation of any one signal or transmission.

In one embodiment, the duration of long PUCCH 630 can vary depending on the presence and duration of other physical channels. In FIG. 6, PDCCH 610 and short PUCCH 650 can have about one symbol duration. In another case, short PUCCH could not be present or generated by the UE 400 within the slot, and thus, the duration of the long PUCCH 630 can take on, be extended, or include another additional symbol or OFDM symbol in which it spans in the time direction along a horizontal x-axis.

For example, either PDCCH 610 or short PUCCH can include about two symbols, and consequentially the duration of the long PUCCH 630 can become shorter commensurate with a decrease in time within the slot. Also, duration of the slot can be reduced by half, resulting in a reduction by half of the symbols within a slot compared to the slot of FIG. 6, in which then the duration of long PUCCH 630 shrinks accordingly with having much less symbols. The structure or configuration of the symbols of the long PUCCH 630 in terms of UCI and DMRS symbols, which helps the receiver to recover the received signal and detect the UCI, can be designed or configured dynamically so that performance and resource efficiency of the long PUCCH 630 are robust against the change in the duration.

In contrast to the short PUCCH 650, the long PUCCH 630 is variably configured in length/duration and can have various structures as a result based on a sequence pattern or multiplexing of alternating DM-RS symbols and UCI symbols. The long PUCCH 630 can also be mapped in a time first manner, while the short PUCCH in a frequency first manner, for example.

In order to generate the long PUCCH 630 dynamically and variably, various structural configurations, which can be referred to herein as building blocks, comprising DM-RS symbols and UCI symbols can be concatenated or otherwise structured to form longer or shorter configurations (e.g., from 4 to about 14 symbols) at each subsequent UL transmission from one transmission to another.

The long NR PUCCH 630 structure can variably be configured to support a wide range of PUCCH lengths (up to 14 symbols) with time division multiplexing (TDM) DM-RS. A UE 400 can generate a design configuration, for example, by utilizing two building blocks to compose the long PUCCH 630 structure for a length of about 4 to 14 symbols. These two different building blocks, for example, can be the structural smallest unit by which the UE 400 can add to, subtract, build or otherwise edit for various UL channel construction. The two building blocks for example can comprise two and three symbols, respectively, and each of the two building blocks contain at least one DMRS symbol. The long NR PUCCH 630 design based on the two building blocks ensures that the long PUCCH is constructed by a combination of the two building blocks to retain about 50% DMRS overhead for any length of a long PUCCH length.

PUCCH 630 carrying 1~2 bits HARQ-ACK can achieve best performance in efficiency with about 50% DMRS overhead. In LTE, PUCCH supports only two lengths, 14 symbols and 13 symbols. The 13 symbols case occurs, for example, when a sounding reference signal (SRS) is configured in a corresponding subframe and accordingly the last symbol in the subframe is punctured with decreasing the length of orthogonal cover code (OCC) sequence for HARQ-ACK symbols from four to three. In particular, this puncturing approach may not work well with the NR long PUCCH because the long PUCCH in NR should support a wide range of PUCCH lengths from 4 symbols up to 14 symbols. The UE 400 variably configuring the long NR PUCCH is advantageous in terms of efficiency in power, signaling efficiency, channel estimation or demodulation to employ a simple and unified design which can ease the implementations and operations at both transmitter and receiver sides according to varying conditions of the network.

Figure 7:
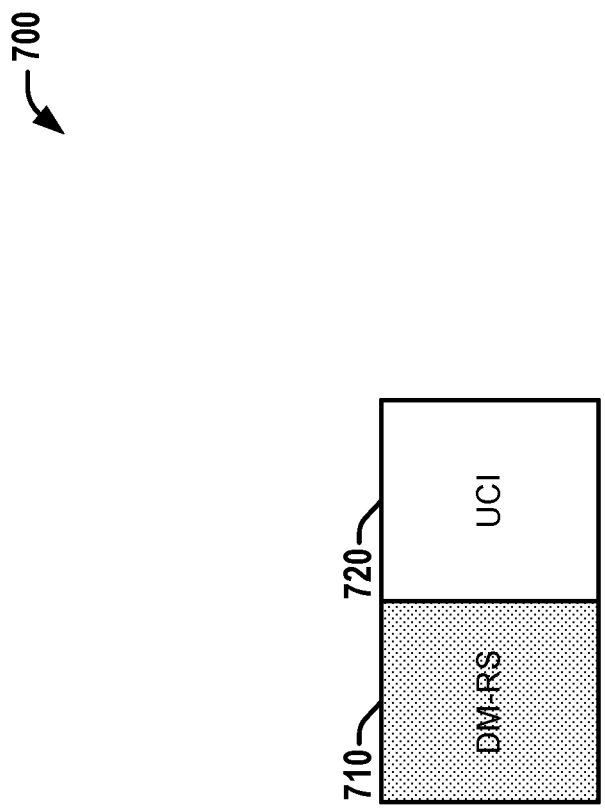
FIGS. 7-8 illustrate further example transmission building blocks or units for generating UL communications according to various aspects/embodiments described herein.
Figure 8:
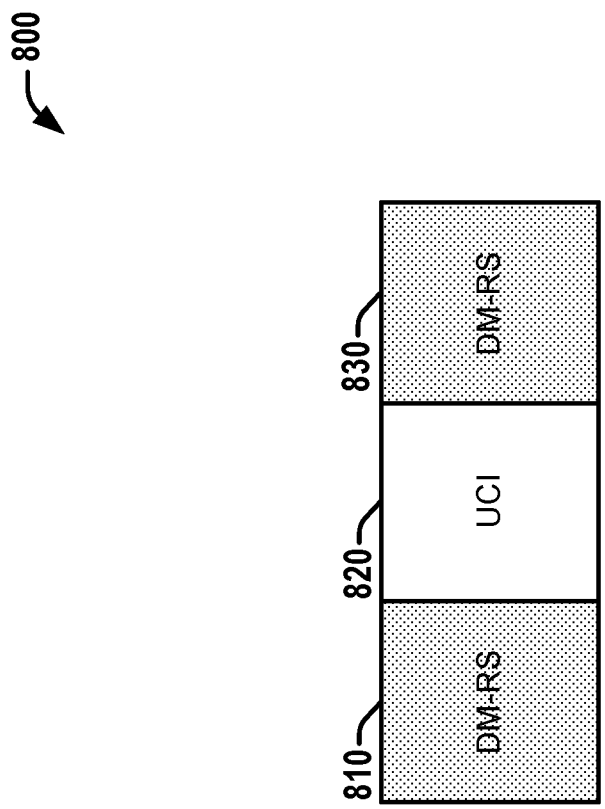

In this regard, FIGS. 7-8 illustrate different building blocks that can be considered to compose the long PUCCH 630 for lengths of about 4 to about 14 symbols. Length of 12 symbols (length-12) for a constant amplitude zero autocorrelation (CAZAC) sequence, for example, can thus also be employed at each DFT-s-OFDM symbol, which enables long PUCCHs 630s from different UEs 400 to be multiplexed on a same Physical Resource Block (PRB) using different cyclic shifts of the CAZAC sequence.

FIG. 7 illustrates an example of a building block, transmission unit or segment 700 with two symbols (length-2) comprising one DM-RS symbol and one UCI symbol (1 DMRS+1 UCI) as a basic building block by which the UE 400 can use to generate the long NR PUCCH from about 4 to about 14 symbols in length for any given UL transmission or slot. The building block 700 of the long NR PUCCH 630 further comprises a sequential pattern, such as an alternating pattern between a symbol carrying DM-RS (DM-RS symbol 710) and a symbol carrying UCI (UCI symbol 720).

In this building block 700, the first symbol comprises a DMRS symbol 710 and the second symbol comprises UCI symbol 720 adjacent to or around the DM-RS symbol 710 in time. This building block 700 or basic unit for construction can ensure that 50% DMRS overhead is maintained even for varying lengths of long PUCCH 630 among transmissions, which can lead to an optimal communication performance when about 1 to 2 bits of HARQ-ACK are carried via the long PUCCH 630. Further, the long PUCCH structure can be constructed or built up among transmissions by concatenations of this building block 700, resulting in a unified structure beneficial to the transmitter and receiver circuitry of the gNB 500 or UE 400 implementations.

Referring to FIG. 8, illustrated is a building block, UL transmission segment or structural unit 800 with three symbols (length-3) comprising two DM-RS symbols and one UCI symbol (1 DMRS+1 UCI+1 DMRS) as a basic building block by which the UE 400 can use to generate the long NR PUCCH from 4 to 14 symbols in length for any given UL transmission or transmission slot, either alone, or together with the transmission 700 of FIG. 7. The building block 800 of the long NR PUCCH 630 comprises a sequential pattern, such as an alternating pattern between a symbol carrying DM-RS (DM-RS symbol 810), a symbol carrying UCI (UCI symbol 820), and a symbol carrying DM-RS (DM-RS symbol 830).

This building block 800 has DMRS symbols at the start and end, and a UCI symbol in the middle. In an aspect, long NR PUCCH 630 with lengths or durations of an odd number can end their sequential pattern with DM-RS symbols and UCI symbols with a DM-RS symbols, while those with an even number of symbols in total length or duration for the transmission or slot can end with a UCI symbol. To generate long NR PUCCH 630 with lengths from four to fourteen total symbols, the UE 400 can concatenate or combine the building blocks 700 and 800 in any number of combinations based on an indication or one or more criteria (an allocated resource, a short NR PUCCH 650 generation, a PDSCH 610 generation, other physical channels therein, or other network conditions) based on optimizing channel estimation or demodulation efficiencies, for example, or add symbols to previous transmissions accordingly.

The building block 800 can provide a robust performance in high mobility scenarios. The DMRS symbols at the start 810 and end 830 enables robust tracking of the channel variation in time, and thus reliable channel estimates can be obtained from the DMRS symbols at the receiver of the gNB 500, for example.

Additionally, the building block 800 can enable a well-structured design for long PUCCHs. Similar to the block 700, a DM-RS symbol can initiate the sequential pattern of symbols at the beginning or start as a front end/front loaded DM-RS pattern, for example, which can further enable faster and more efficient channel estimation.

As seen in FIGS. 7 and 8, each of the two building blocks 700 and 800 contain at least one DMRS symbol and ensures that the long PUCCH constructed by combination of the two building blocks retains about 50% DMRS overhead for any long PUCCH length for the UL transmissions being generated by the UE 400. This 50% overhead can be achieved by having a same or one more DM-RS symbols in the long NR PUCCH 630 compared to the number of UCI symbols therein, in which a 50% DM-RS overhead can refer to the number of DM-RS symbols over (or divided by) a total number of symbols in the UL transmission segment/slot for transmission expressed as a percentage.

Referring to FIGS. 9-14, illustrated are embodiments of long PUCCHs 630 that can be configured as and composed from the above two building blocks 700 and 800.

Figure 9:
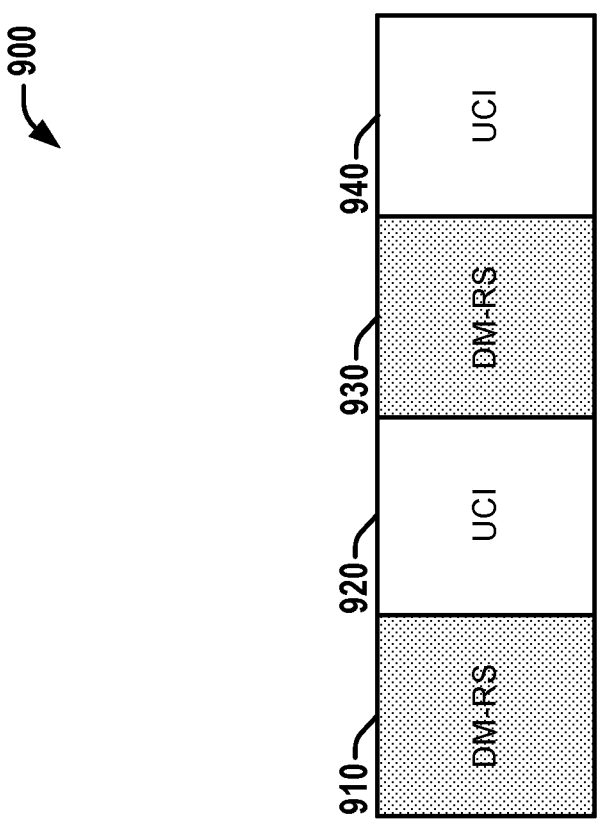
FIGS. 9-15 illustrate example transmissions for UL communications according to various aspects/embodiments described herein.

FIG. 9, for example, illustrates an example long NR PUCCH 630 of a UL transmission 900 with four symbols (length-4). The UE 400 can generate the length-4 PUCCH format as the UL transmission 900 by concatenating the two 2-symbol building blocks 700, for example, to configure symbols 910, 920, 930 and 940 in an alternating sequence initiating with a DM-RS symbol 910.

If the UE 400 generates a four symbol PUCCH illustrated in FIG. 9 with UL transmission 900, a DM-RS can be placed at/on the first symbol 910 and the third symbol 930, and the UL control information (UCI) bits can be mapped on the second and fourth symbols 920 and 940, respectively.

Figure 10:
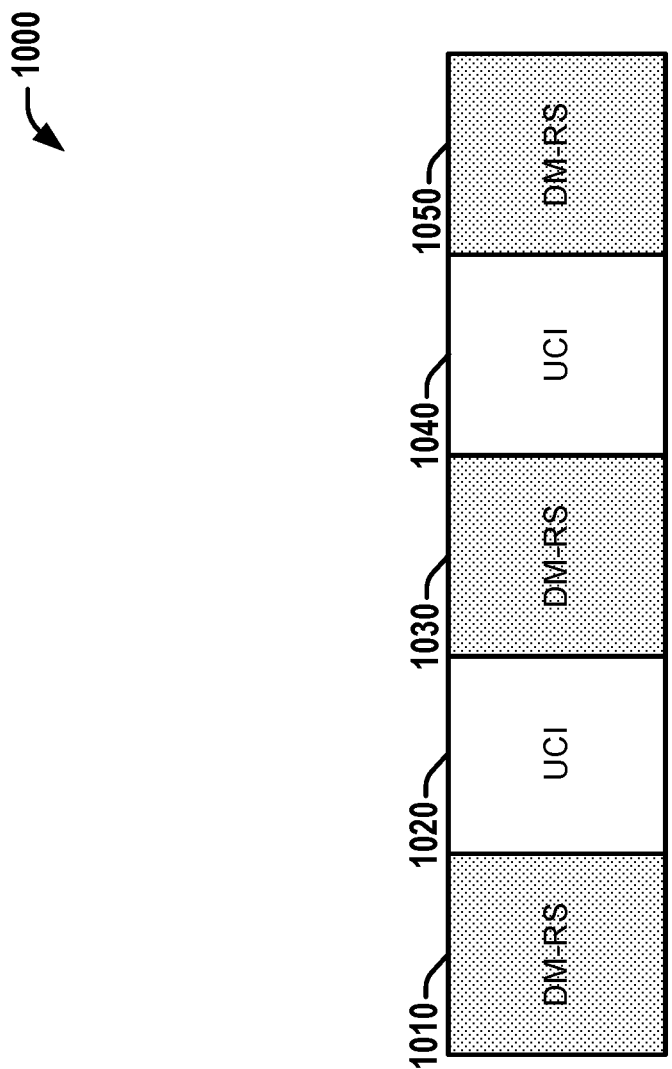

FIG. 10 illustrates another example of a long NR PUCCH 630 of UL transmission 1000 with five symbols (length-5). The UE 400 can generate the length-5 PUCCH format as the long NR PUCCH 630 of UL transmission 1000 by appending a 3-symbol building block 800 to a 2-symbol building block 700, for example, to configure symbols 1010, 1020, 1030, 1040 and 1050 in an alternating sequence that initiates with a DM-RS symbol 1010 and ends with DM-RS symbol 1050.

The UE 400 can thus generate a variation in length that increases from the transmission 900 where in the case of a five symbol generation, the DM-RS symbol 1050 can be concatenated to the structure of the four symbol PUCCH 1000. This can be a way of inserting the bits when increasing the PUCCH among iterations, in which other such examples are demonstrated in FIGS. 11-14 as well, and other embodiments/aspects herein. Further, by placing the DM-RS and the UCI symbols in an alternating manner with an initial DM-RS at the starting location in the symbol sequence, a 50% overhead of DM-RS symbols can be maintained with increasing the PUCCH duration.

Figure 11:
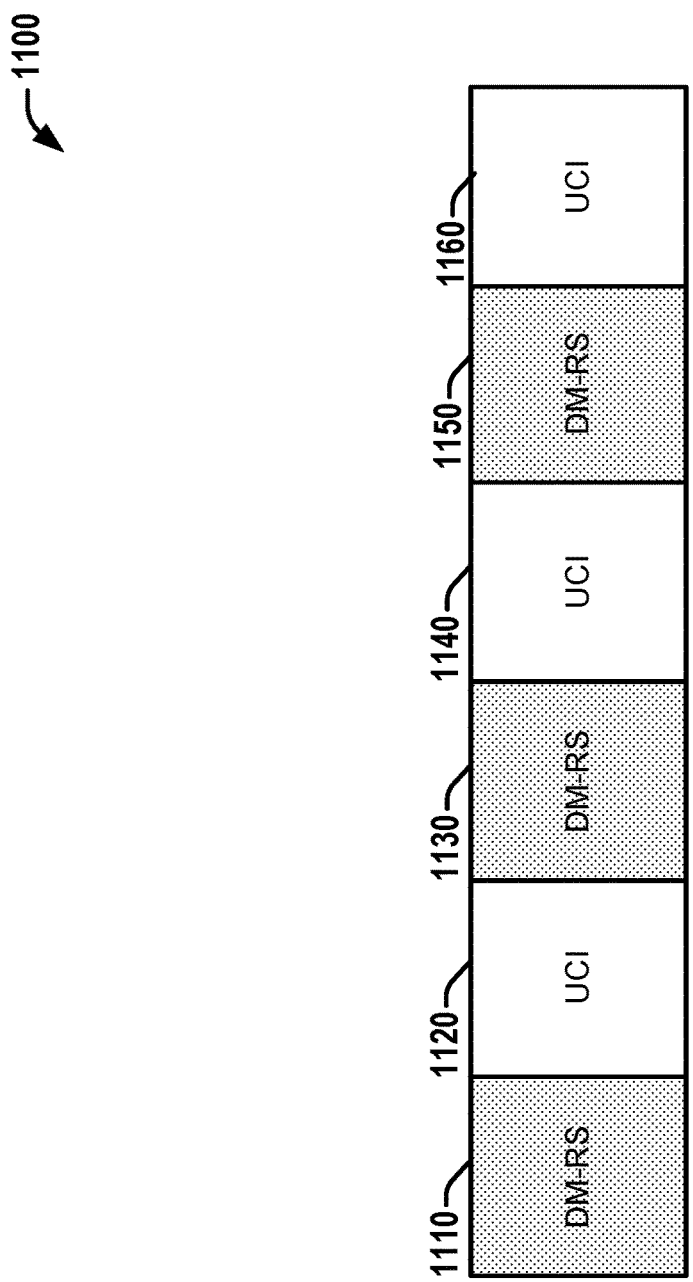

FIG. 11 illustrates another example of a long NR PUCCH 630 of UL transmission 1100 with six symbols (length-6). The length-6 PUCCH format as the long NR PUCCH including symbols 1110 through 1160 can be generated by concatenating the three 2-symbol building blocks 700, for example, or generating the sequences of symbols individually in a similar pattern.

Figure 12:
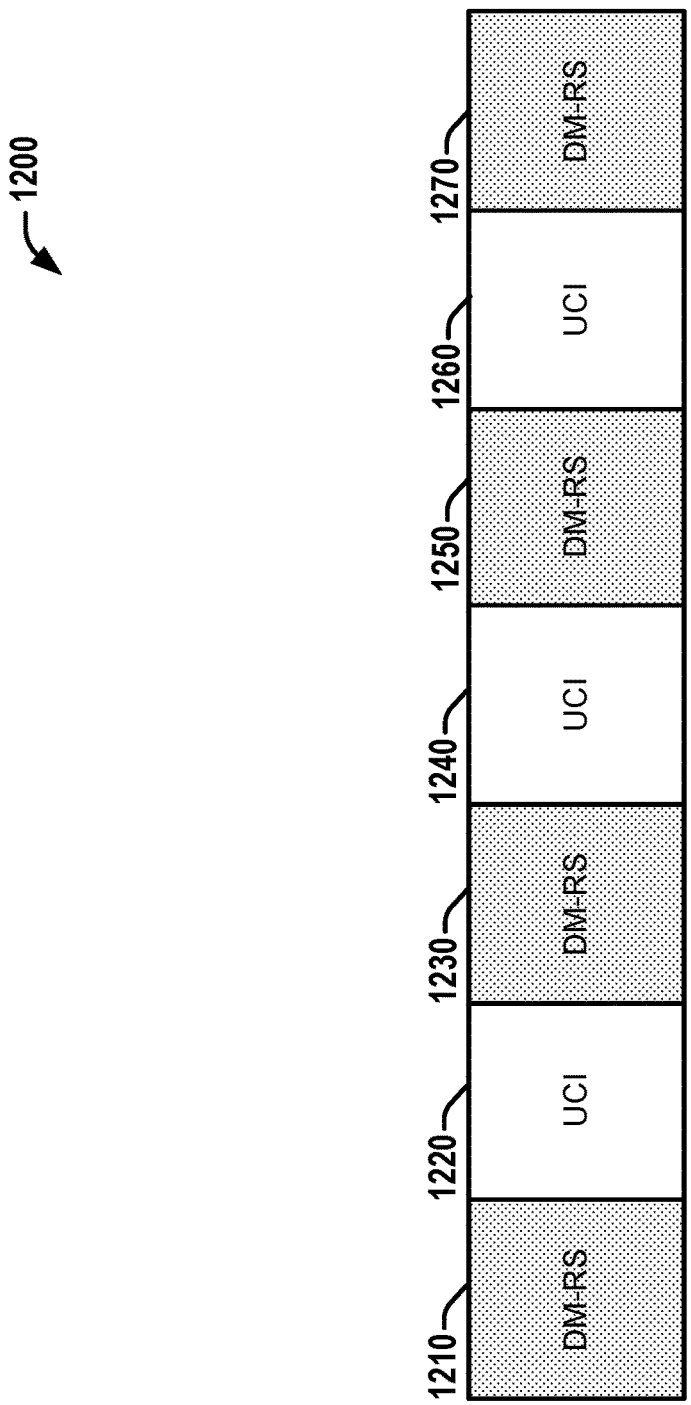

FIG. 12 illustrates another example of a long NR PUCCH of UL transmission 1200 with seven symbols (length-7). The length-7 PUCCH format as the long NR PUCCH including symbols 1210 through 1270 can be generated by concatenating the two 2-symbol building blocks and one 3-symbol building block, for example, or other combinations as one of ordinary skill in the art could appreciate.

Additionally, the long NR PUCCH structures/configurations herein can be configured for NR PUCCH in Format 1 based on 3GPP Technical Specification (e.g. TS 38.211) in addition to the various length-# formats denoted herein. NR PUCCH format 1, for example, can be operable to convey one or two HARQ-ACK bits, as well as be used to transmit scheduling or scheduling request.

In LTE PUCCH format 1a and 1b for the DM-RS on a seven symbol length UL transmission, the DM-RS can be concentrated in the middle/center symbols of the transmission, for example, with three DM-RS symbols at locations corresponding to third, fourth and fifth symbols of the locations 1230, 1240, and 1250 of FIG. 12. However, for the long NR PUCCH 630, the symbol sequence pattern can be configured in an alternating pattern so that DM-RS symbols are placed at a first symbol location 1210, a third location 1230, a fifth symbol location 1250, and a sixth symbol location 1270, for example, with UCI symbols at the symbol locations of symbols 1220, 1240, and 1260, for example.

In various aspects, the UE 400 can communicate with the gNB 500 to support a flexible structure in the long NR PUCCH of UL transmissions with varying PUCCH duration while maintaining about a 50% DM-RS overhead or higher, in which DM-RS symbols are greater in number than UCI symbols per UL transmission/slot or physical UL channel.

An advantage of maintaining a 50% overhead with seven symbols for DM-RS as in transmission 1200 is that with the seven symbols a 50% overhead or greater DM-RS overhead can be obtained by utilizing four DM-RS symbols. In addition, configuring the UL transmission with the four DM-RS symbols is that the gNB 500 receiver benefits from obtaining/receiving DM-RS earlier than UCI symbols in order to begin channel estimation sooner. In order to detect/receive the bits with high confidence, the gNB 500 receiver has to first estimate the PUCCH channel from DM-RS, and thus, receiving UCI first, the estimation is pending until the DM-RS is received. Thus, by placing the DM-RS on the first symbol 1210 or at a first location, then the gNB 500 can perform channel estimation sooner, before receiving the UCI and perform the demodulation and the detection operations for HARQ-ACK bits.

Figure 13:
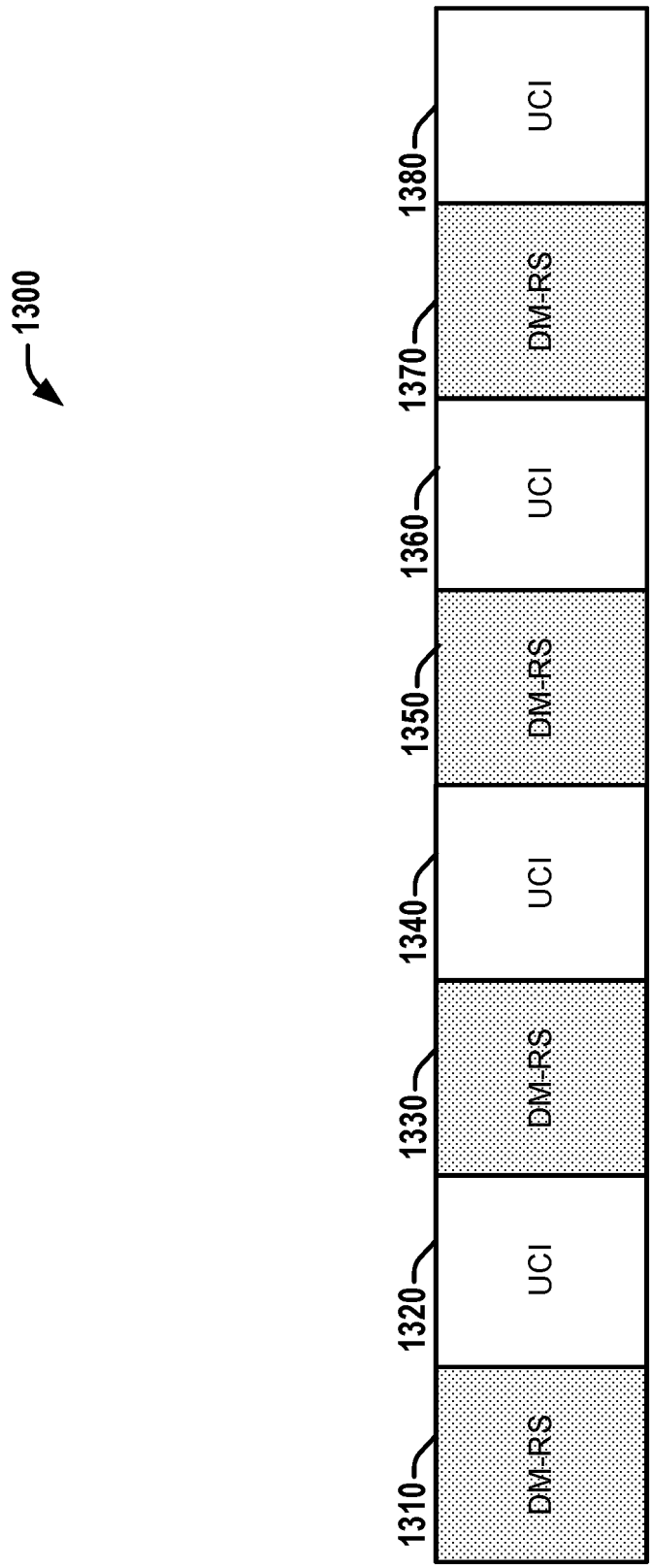

Referring to FIG. 13, illustrates another example of a long NR PUCCH 630 of UL transmission 1300 with 8 symbols (length-8). The length-8 PUCCH format as the long NR PUCCH including symbols 1310 through 1380. The length-8 PUCCH format can be generated by concatenating the four 2-symbol building blocks, for example, or other combinations of DM-RS symbols and UCI symbols in an alternating pattern.

Long PUCCH of the other lengths, for example, can be generated by concatenating the 2-symbol building blocks only or concatenating the 2-symbol and one 3-symbol building blocks.

Figure 14:
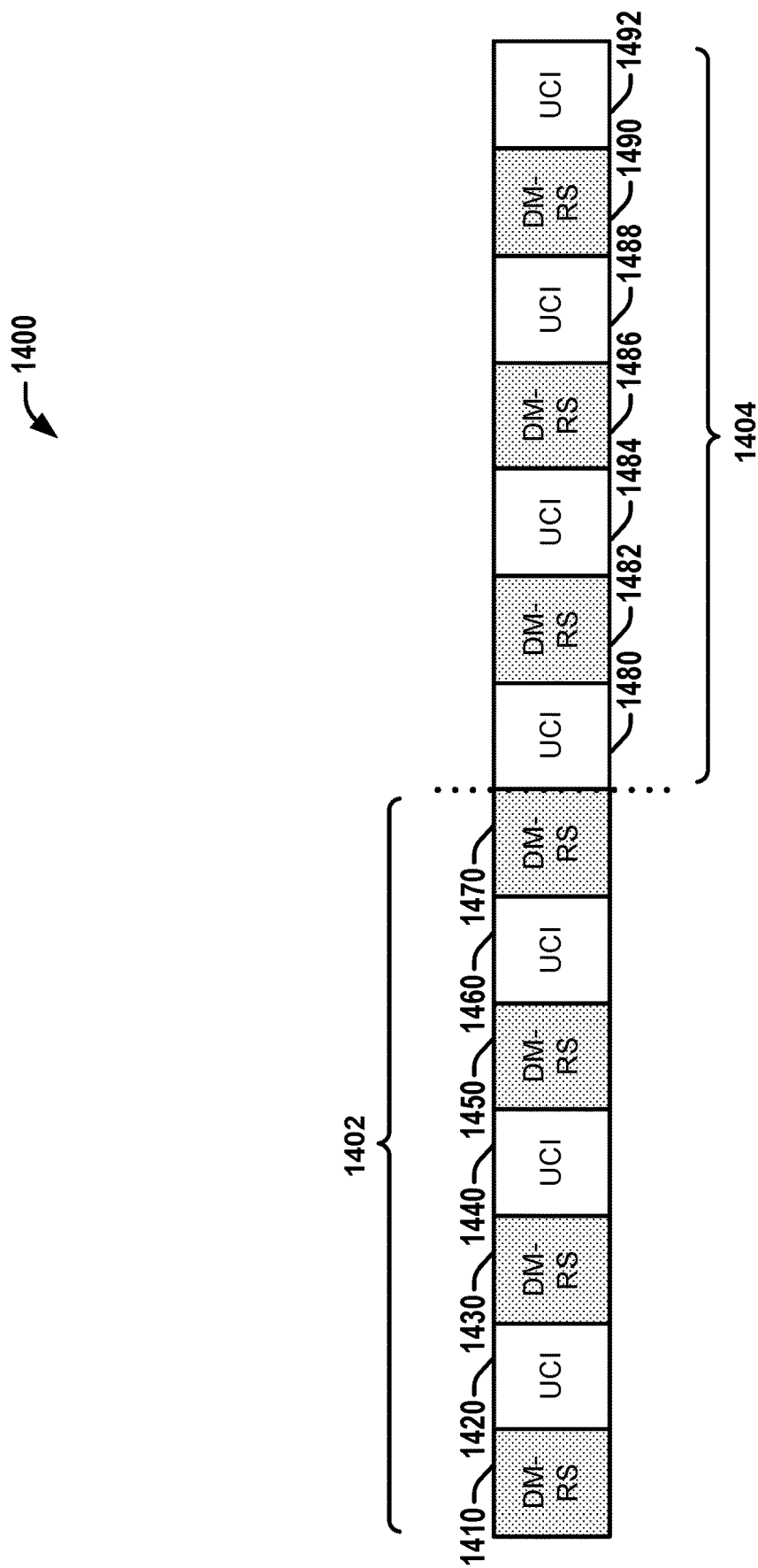
Figure 15:
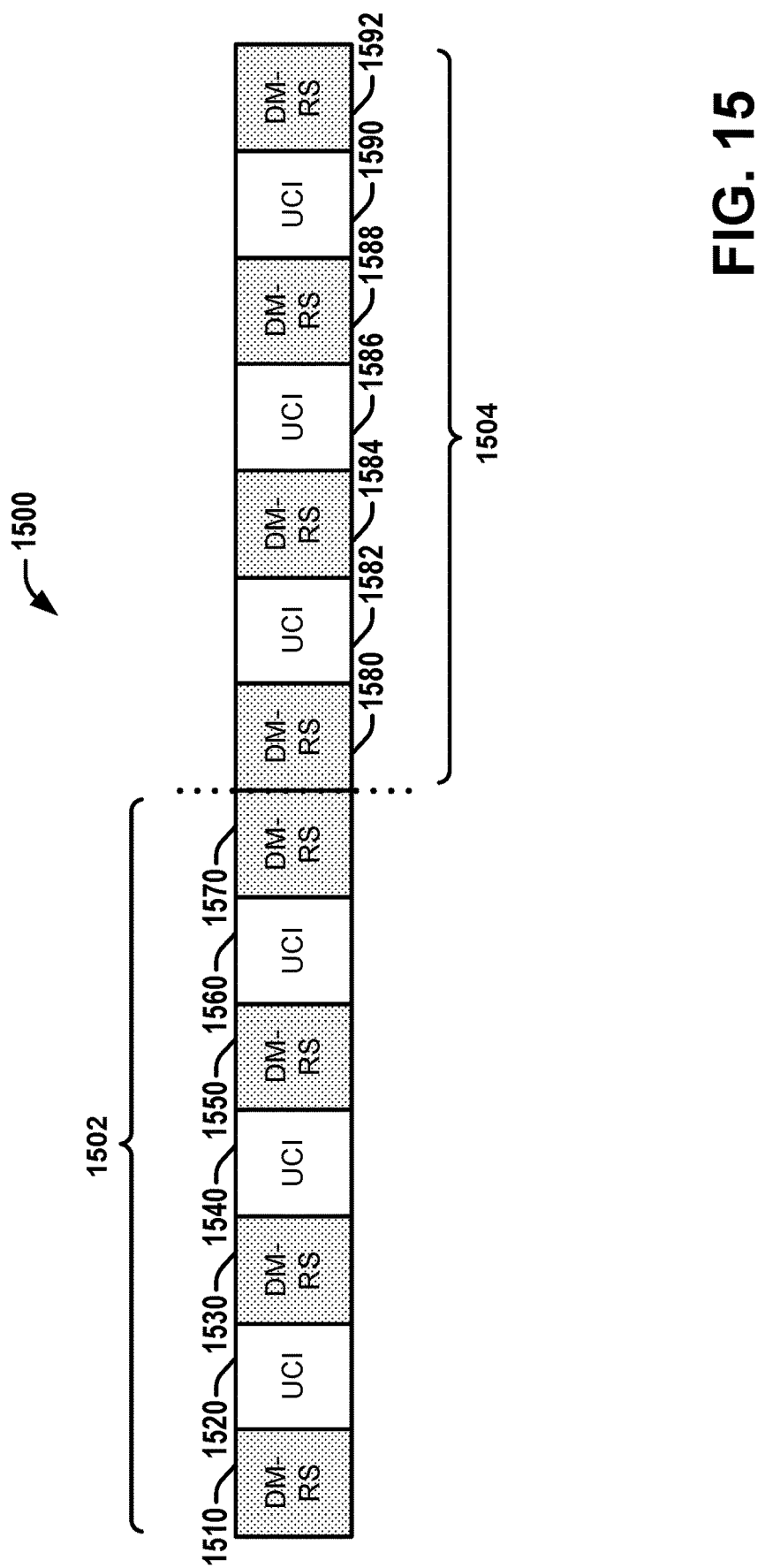

Referring to FIGS. 14-15, illustrated are examples of long NR PUCCH 630 of UL transmissions 1400 and 1500 with 14 symbols, respectively.

The UE 100, for example, can configure the UL transmission 1400 of FIG. 14 along similar sequences as provided in FIGS. 7-13, in which a first segment or portion 1402 of the UL transmission of the long NR PUCCH includes more DM-RS symbols than a second segment or portion 1404, an alternative pattern is generated and the transmission or physical NR UL channel is DM-RS front loaded with DM-RS at a starting position. As such, a 50% DM-RS overhead can still be maintained throughout the UL transmission over the total number of symbols for 1410 to 1492 with an alternating placement between DM-RS and UCI, initiating at the start of the transmission with the DM-RS at 1410.

The first example length-14 PUCCH format of UL transmission 1400, for example, can be generated by concatenating the seven 2-symbol building blocks, for example, or other combination of symbols. This example of transmission 1400 can have a maximum commonality with the other long PUCCHs of even lengths.

Referring to FIG. 15, illustrated is another example long NR PUCCH 630 of a UL transmission 1500. A first segment/portion 1502 of seven symbols of the transmission 1500 is similar to the segment 1402 of UL transmission 1400. Both segments 1502 and 1504 retain an alternating pattern with DM-RS symbols 1510, 1530, 1550, 1570, 1580, 1584, 1588, 1592, as well the UCI symbols 1520, 1540, 1560, 1582, 1586, 1590. However, the second segment 1504 of the UL transmission 1500 is substantially the same symbol pattern, or repeats the same sequence as the first segment 1502.

The length-14 PUCCH format of the UL transmission 1500 can be generated, for example, by concatenating various 2-symbol building blocks 700 and 3-symbol building blocks 800, or by other combination of symbols. The generation of the long NR PUCCH 630 of UL transmission 1500 can be equivalent to concatenation of two length-7 PUCCH formats illustrated above in FIG. 12.

Other aspects/embodiments can related to frequency hopping mechanisms or operations for transmission generation and reception processing of the UL transmissions in NR. The long NR PUCCH 630 of UL transmission 1500 can retain the same length-7 structure as the cases of intra-frequency hopping of length-14 long PUCCH in which 7 symbols comprise each frequency hopped segment as the segments 1502 and 1504 of FIG. 15, or the segments 1402 and 1404 of FIG. 14.

Figure 16:
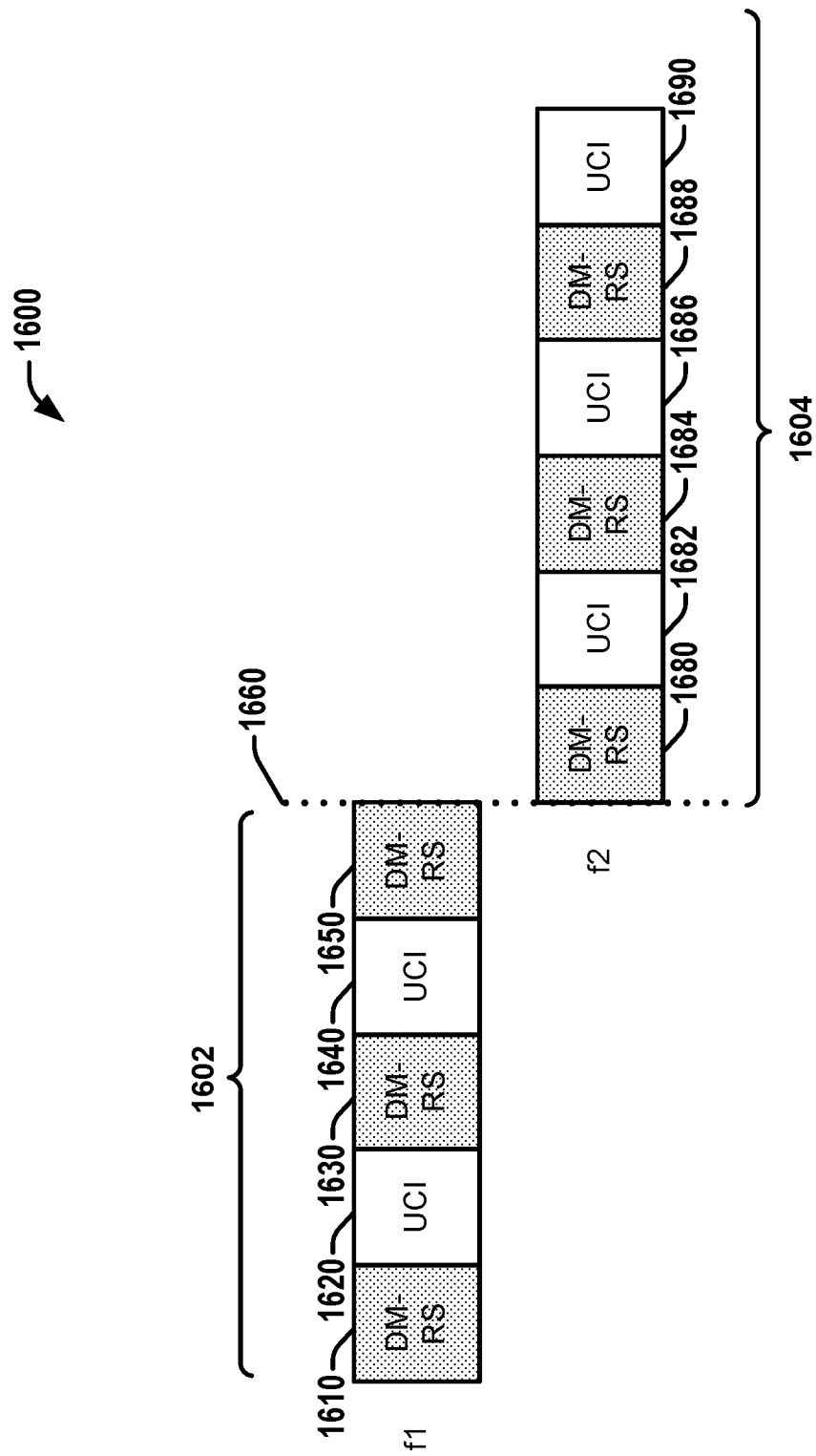
FIG. 16-18 illustrates further example transmission for UL communications with frequency hopping according to various aspects/embodiments described herein.
Figure 17:
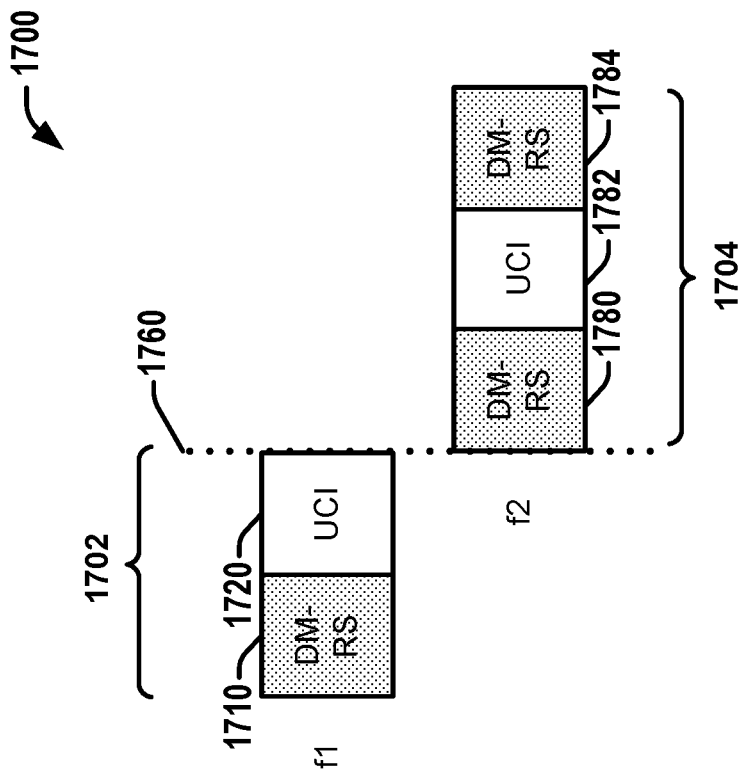

Referring now to FIGS. 16 and 17, illustrated are example frequency hopping operations with symbols patterns that can be configured similarly as the UL transmissions exemplified and described in the above embodiments/aspects.

Referring to FIG. 16, illustrated is an example frequency hopping configuration that can be used by a network device (e.g., UE 400, gNB 500, or the like) for NR communications. The UL transmission 1600 of an NR PUCCH (e.g., the long NR PUCCH 630), as well as the other long NR PUCCH examples herein, can comprise various numbers of symbols, varying from about 4 to 14 symbols in length with a sequential pattern of DM-RS symbols and UCI symbols according to the various embodiments herein.

Where intra-frequency hopping is applied for communications, a long PUCCH format of the length that corresponds to the transmission duration of a frequency hopped segment can be used. For example, for a long PUCCH transmission 1600 with 11 symbols in total and 5 and 6 symbols respectively in the two frequency hopped segments 1602, 1604, length-5 and length-6 structures can be applied to the respective transmission segments due to the frequency hopping, for example. The first transmission segment 1602 of length-5 can be sent on frequency block $f_1$ of a first frequency as an allocated resource and the second transmission segment of length-6 can be sent on frequency block $f_2$ of a second different frequency.

A frequency boundary 1660 can be representative of a time separation between the two segments of different frequencies and delineate separation in a middle for the different segments of the long NR PUCCH for the UL transmission to be communicated. Each segment regarding frequency hopping as disclosed herein can also refer to or be referred as a frequency hop for a first or second transmission, which can operate at different frequencies for each frequency hop as scheduled by the gNB 500, for example. Although particular lengths, and symbol locations, are provided for example explanation, other lengths or symbol locations can be enabled and generated as described in various embodiments/aspects herein.

In an aspect, although the first symbol of the UL transmission 1600 in the first segment portion 1602 initiates with the DM-RS, the second segment 1604 can initiate with a UCI symbol instead or as illustrated with the DM-RS 1680.

Referring to FIG. 17, illustrated is another example frequency hopping configuration that can be used by a network device (e.g., UE 400, gNB 500, or the like) for NR communications. For UL transmission segments 1702, 1704 shorter than 4 symbols, the length-2 and length-3 building blocks can be used for generation of the UL transmission 1700. In the example illustration, length-5 PUCCH is transmitted with frequency hopping into two segments 1702 and 1704 of length-2 and length-3 transmission segments at different frequencies $f_1$ and $f_2$, for example, around a boundary or threshold 1820. Similarly, as described in other configurations herein, when performing frequency hopping, these building blocks can be used to further generate longer structures or configurations in UL transmission or when frequency hopping.

Figure 18:
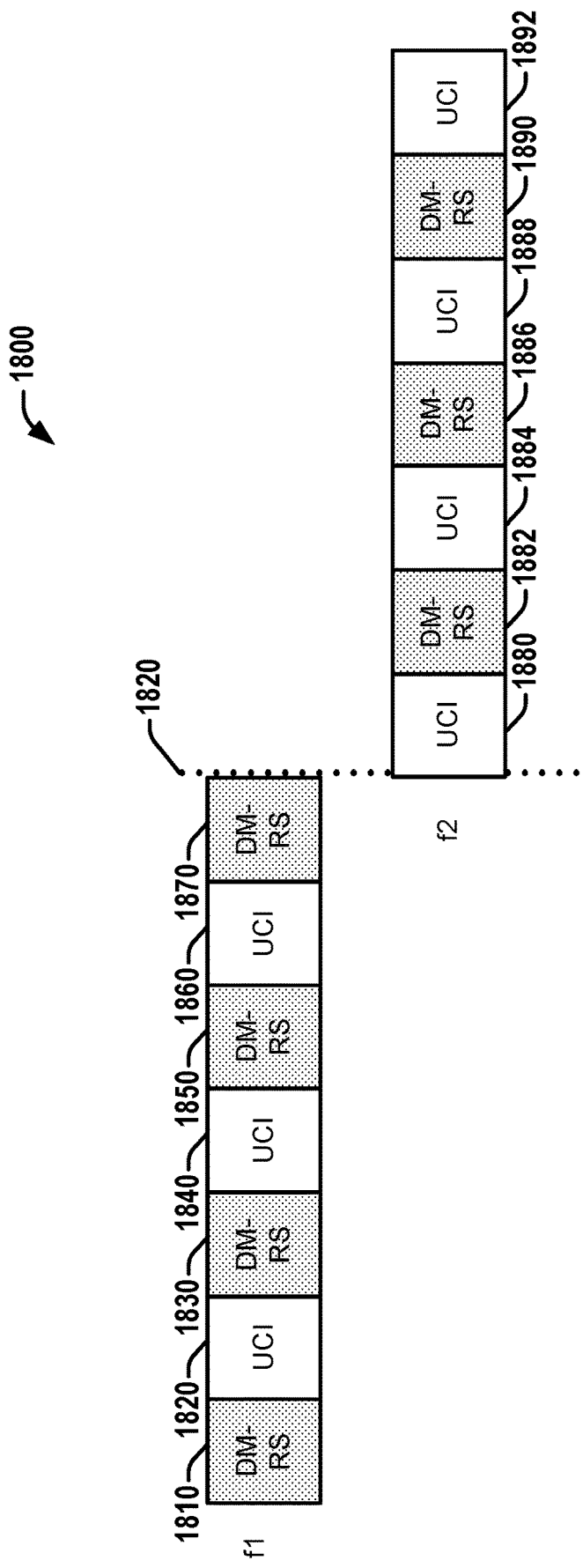

Referring to FIG. 18, illustrated is another example frequency hopping configuration that can be used by a network device (e.g., UE 400, gNB 500, or the like) for NR communications. A first segment comprises symbols 1810 to 1870 at a first frequency $f_1$, while a second segment comprises symbols 1880 to 1892 in accordance with various embodiments/aspects herein. Here, the second segment of symbols 1880 to 1892 initiates with a UCI instead of a DM-RS in the first segment of symbols 1810 to 1870; although, as illustrated in FIG. 16, the second segment could additionally, or alternatively, initiate with a DM-RS on the symbol 1880. The UE 400 can thus generate an NR physical UL channel with a 14 symbol duration parameter and communicate the UL transmission by performing a frequency hopping operation between the two segments, which are multiplexed with DM-RS and UCI in a sequential pattern, such as in an alternating pattern.

Figure 19:
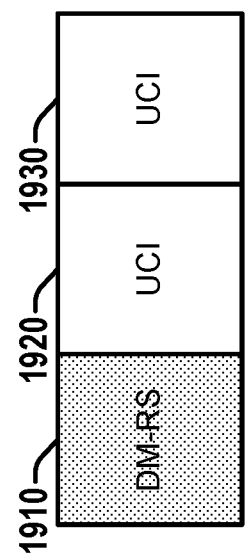
FIG. 19 illustrates another example building block for generating UL communications according to various aspects/embodiments described herein.

Referring to FIG. 19, illustrated is another example of a potential building block or transmission unit/portion that could also be utilized in the generation or processing of an NR physical UL channel in UL transmissions. For example, the structure 1900 can be used for a length-3 building block, which contains 1 DM-RS symbol 1910 and 2 UCI symbols 1920 and 1930 next to one another. In the previous Figures of the various lengths of long PUCCH, the length-3 building block 1900 can be used in place of or in addition with the length-3 building block with 2 DMRS symbols and 1 UCI symbol 800 of FIG. 8.

In the aforementioned embodiments, different locations of DMRS and UCI symbols within each of the length-2 and length 3 building blocks can be applied as well. For example, the length-2 building block can have UCI symbol at the start and DMRS symbol at the end. Also, for the length-3 building block, the first two symbols are DMRS symbols and the last symbol can be UCI symbol. Regardless of the exact location of the DMRS and UCI symbols within each building block, long PUCCHs for the various lengths can be constructed as presented above, either as individual symbols or in structural blocks/configurations as described.

Figure 20:
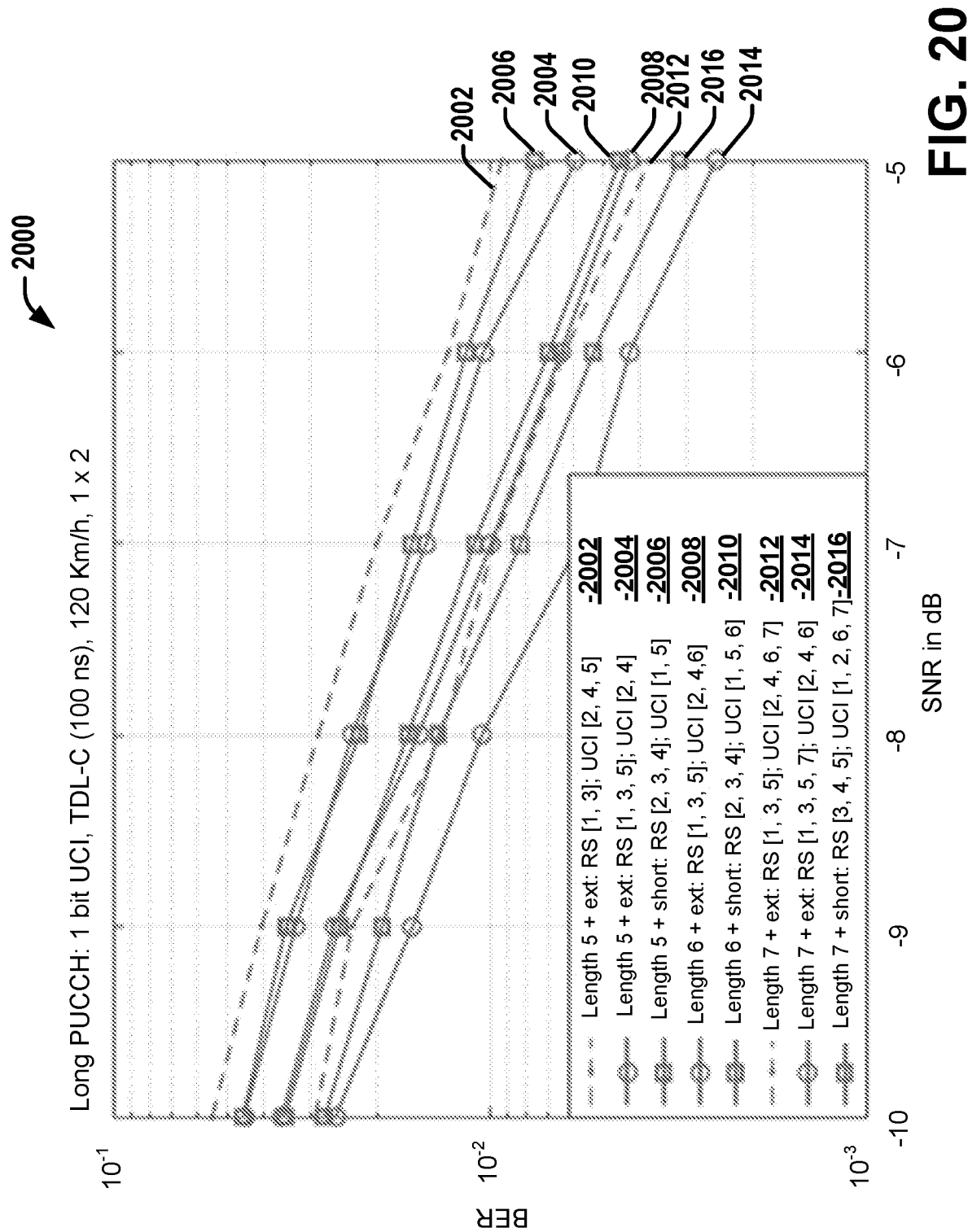
FIG. 20 illustrates an example simulation comparison for various UL transmission communications according to various aspects/embodiments described herein.

Referring now to FIG. 20, illustrated are simulation results 2000 for 1 bit HARQ-ACK detection performance. Length-5, length-6 and length-7 long PUCCH (e.g., long NR PUCCH) were evaluated. For each case of PUCCH lengths 2002 thru 2016, different structures for the number of DMRS symbols and the location of the DMRS symbols were compared. The plots with circle markers correspond to the PUCCH structures presented as embodiments above described herein with respect to the long NR PUCCH configurations for UL transmission. It is seen that the presented PUCCH structures outperform the other structures by 0.2 dB~1 dB for the simulation assumptions of TDL-C channel model, RMS delay spread 100 ns, speed 120 km/h, and 1 Tx 2 Rx antennas.

Along the horizontal axis is SNR and along the vertical axis is HARQ-ACK bits error rate (BER), in which a smaller BER can be considered an improvement. The bottom-most curve 2014 offers the least error and is the best performing curve, which is represented by a circle and corresponds to the design that was adopted and proposed herein. Curve 2014, as can be seen at the legend, is a seven symbol length transmission with DM-RS (RS) located at locations 1, 3, 5, and 7, and UCI located at symbols 2, 4, and 6, for example.

For transmission durations of length 5, there are three curves 2002, 2004, and 2006 plotted to compare the performance between the cases of different DM-RS locations. The first curve 2002 has DM-RS added at 1, 3 as the positions of DM-RS at first and third symbols or symbol positions, with the second, fourth and fifth symbols are UCI. As such, a three symbols block 800 starts with a DM-RS followed by two UCI.

Curves 2004, 2008, and 2014 (with a circle) plot various embodiments/aspects herein for NR UL transmission, performing with less error and more optimal performance than other structures of similar or different lengths. For example, the curve 2004 has DM-RS is placed on the 1, 3, 5 symbol and UCI on 2, 4 symbol. In contrast, an LTE structured curve (with a square) comprises DM-RS in center locations only, where, for example, curves 2006, 2010, and 2016 comprise DM-RS at symbol locations/indexes 2, 3, 4 or 3, 4, 5, respectively, where UCI is located at: 1, 5; 1, 5, 6; and 1, 2, 6, 7, respectively.

Here the proposed structure/configurations for NR can be shown to outperform the structure with the DM-RS concentrated in the middle of the long PUCCH, with comparison of the structures having DM-RS on the first symbol and having UCI on the first symbol.

Figure 21:
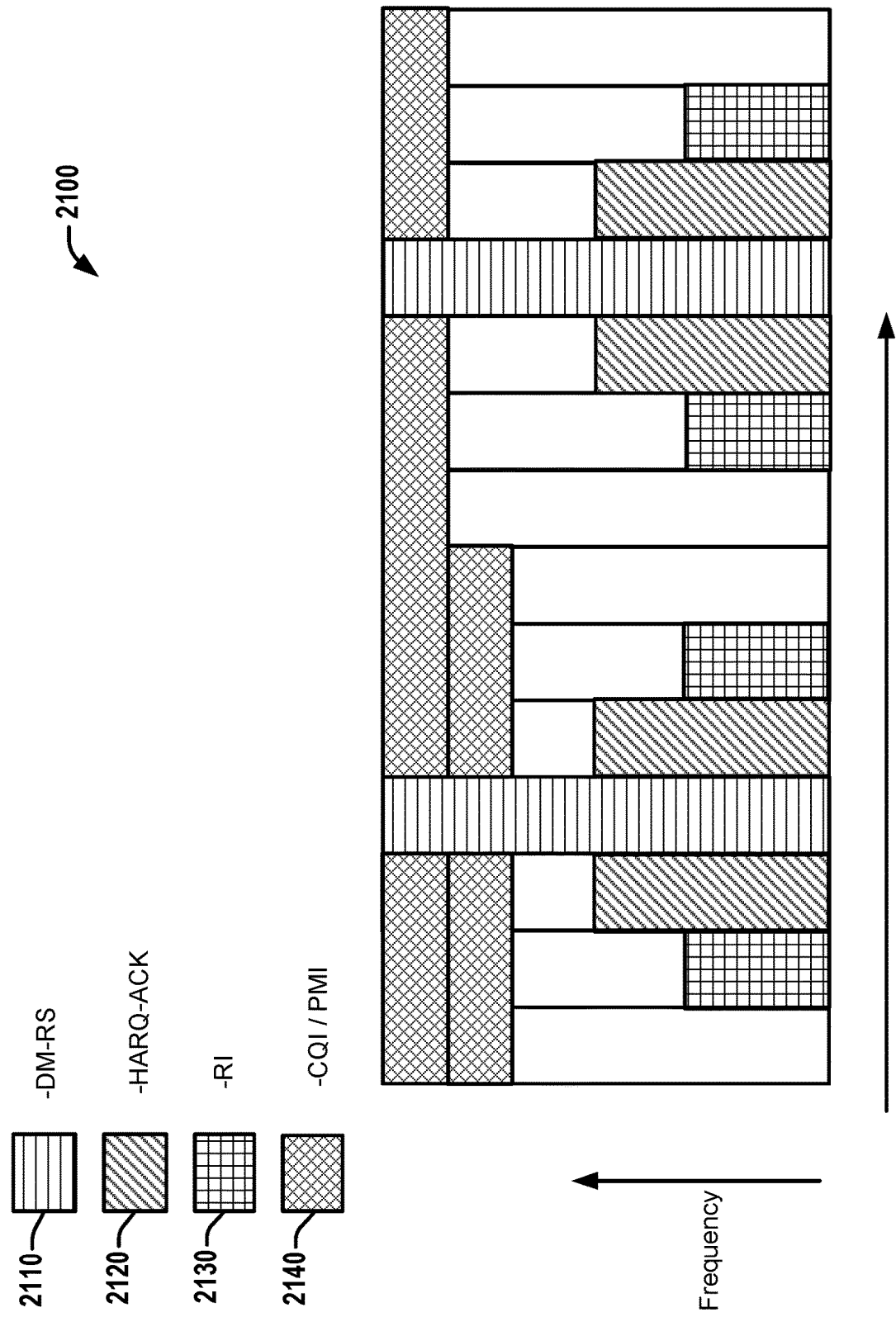
FIG. 21 illustrates a multiplexing scheme for UCI on PUSCH according to various aspects/embodiments described herein.

Referring to FIG. 21, illustrated is an example of multiplexing schemes 2100 for UCI on PUSCH along a frequency vertical axis and a time horizontal axis. The DM-RS can be seen by the hashing pattern 2110, HARQ-ACK feedback as the hashing pattern 2120, RI as the hashing pattern 2130, and CQI/PMI as the hashing pattern 2140.

UCI carries the HACK-ACK (or ACK/NACK) feedback with the channel state information (CSI) report, which can also include channel quality indicator (CQI), a precoding matrix indicator (PMI) and rank indicator (RI) as part of the CSI report. In LTE, multiplexing schemes for UCI on PUSCH can be utilized. To avoid or reduce the risk of the UCI colliding with data, the UCI can be multiplexed with the PUSCH. So if a network device (e.g., the UE 400) transmits the PUCCH, which carries UCI, and the PUSCH carrying data at the same time for UE implementation a collision could occur, and thus the UCI can be multiplexed with resource data on PUSCH as a solution.

FIG. 21 illustrates a multiplexing scheme 2100 for UCI on PUSCH in LTE. In order to resolve ambiguity issues between eNB and UE due to miss detection of the PDCCH carrying DL assignment, the HARQ-ACK feedback 2120 can be punctured into the encoded data bits. In this case, regardless of the presence of HARQ-ACK feedback 2120, the eNB can still be able to decode the uplink transmission from non-punctured data symbols. Further, encoded HARQ-ACK symbols are placed on single-carrier frequency division multiple access (SC-FDMA) symbols adjacent to DeModulation-Reference Signal (DM-RS) position 2110, which can deliver better channel estimation quality and decoding performance. For other uplink control information (UCI) types, rank indicator (RI) 2130 is located on the symbols next to HARQ-ACK symbols by employing a similar mapping scheme, while channel quality indicator (CQI) and precoding matrix indicator (PMI) 2140 are mapped sequentially to all SC-FDMA symbols in a time first manner using same modulation scheme as data transmission In various aspects/embodiments disclosed herein for NR, front loaded DM-RS patterns can be generated by the UE 400 to allow fast decoding at the receiver of the gNB 500. More specifically, DM-RS 2130 can be located prior to PUSCH transmission. In this case, a different multiplexing scheme for HARQ-ACK 2120 and other UCI types on PUSCH can be defined for NR so as to improve the channel estimation quality and thereby detection performance.

Various embodiments provide multiplexing schemes for UCI on PUSCH. In particular, embodiments may provide: multiplexing scheme(s) for HARQ-ACK on PUSCH; and multiplexing schemes) for other UCI types on PUSCH.

Figure 22:
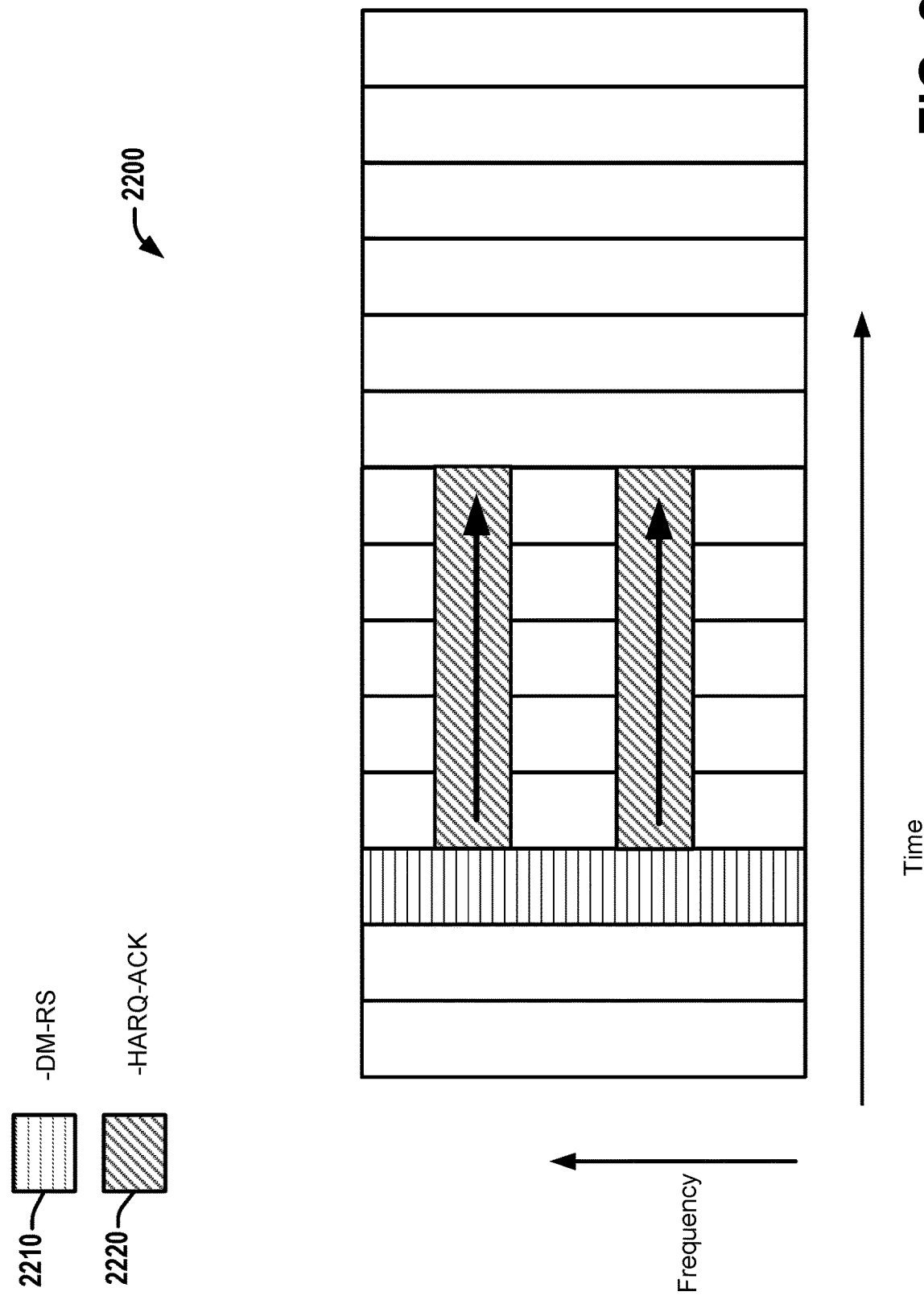
FIG. 22-23 illustrate a multiplexing scheme for HARQ-ACK on PUSCH according to various aspects/embodiments described herein.
Figure 23:
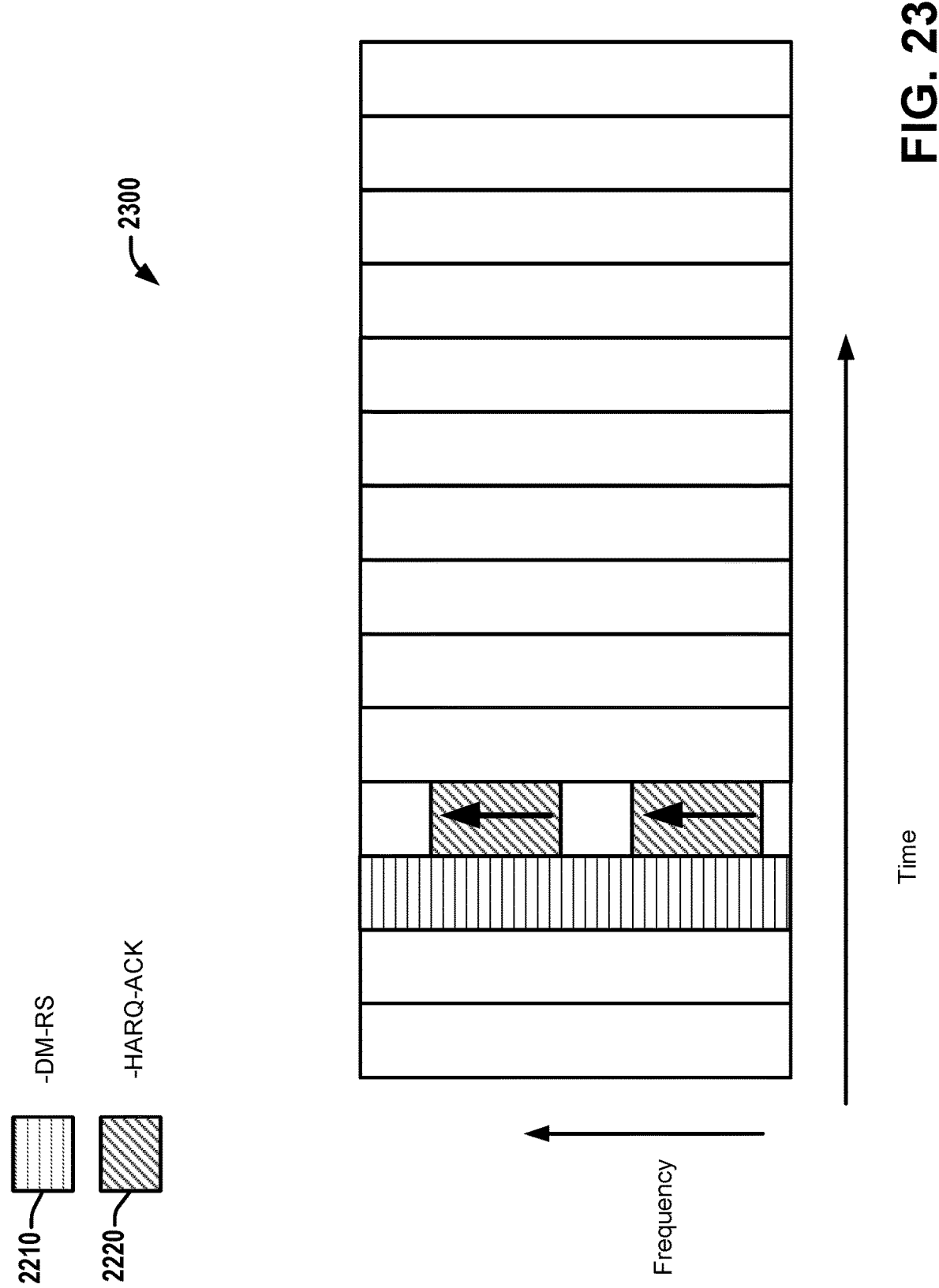
Figure 24:
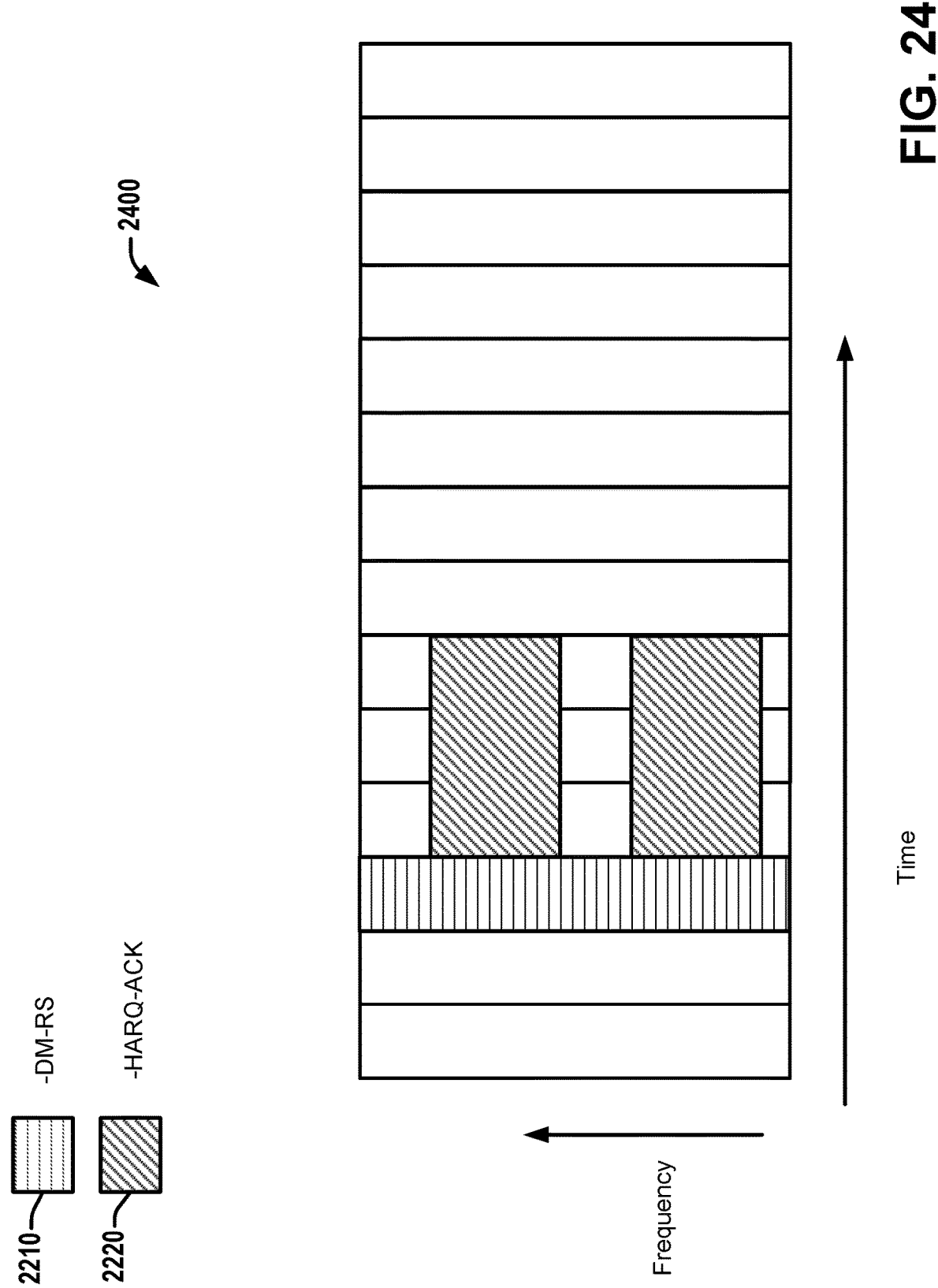
FIG. 24 illustrates a multiplexing scheme for HARQ-ACK on PUSCH according to various aspects/embodiments described herein.

In accordance with embodiments for multiplexing HARQ-ACK 2220 on PUSCH 2200-2400 in FIGS. 22-24 additional aspects are described.

In LTE, the amount of resources for UCI on PUSCH 2200 of FIG. 2200 can be determined according to the parameters that are configured by higher layer signalling. A similar mechanism can be applied to the UCI embedding in NR as well via the UE 400. More specifically, a rate matching parameter for each of the UCI types can be configured by the network considering target performance objectives for the corresponding UCI type. For the configured values of the respective rate matching parameters, the number of repetitions of the embedded UCI symbols can vary depending on the modulation and decoding scheme (MCS) applied to the UL data, as transmit power of the PUCCH is affected by the scheduled MCS.

For HARQ-ACK feedback 2210, similar design principle in LTE can be applied for NR, e.g., puncturing the encoded data bits, which can help to address any rate-matching misalignment issues between gNB 500 and UE 400. Embodiments of multiplexing schemes for HARQ-ACK feedback 2210 on PUSCH 2200 can be according to various aspects and embodiments herein.

In one embodiment, the encoded HARQ-ACK symbols 2120 can be mapped in a time first manner or time first mapping operation before then (afterwards) generating the channel or encoding the NR physical UL channel via a frequency second mapping operation. This can be beneficial in term of coverage enhancement, especially when considering the scenario for UCI only on PUSCH. In cases of narrow-band resource allocation, HARQ-ACK feedback 2220 spanning multiple symbols can help improve the link budget. As such, FIG. 22 illustrates one example of time first mapping of HARQ-ACK feedback on PUSCH with spreading in time.

FIG. 23 demonstrates another embodiment of multiplexing HARQ-ACK 2220 on PUSCH 2300. In contrast to the mapping along frequency and time in the PUSCH 2200 of FIG. 22, the encoded HARQ-ACK symbols 2220 can be mapped in a frequency first manner, starting from the first symbol after one or more DM-RS symbol(s) 2210. With a front-loaded DM-RS structure 2210, as discussed herein with an initial NR sequence of a UL transmission being a DM-RS symbol 2210, this frequency first mapping can provide a robust channel estimation performance and meanwhile allow more time for gNB 500 to process HARQ-ACK feedback 2220 and also generate PDCCH with DL assignment and PDSCH with a new transmission or retransmission. While the ensuing embodiments also assume front-loaded DM-RS structure 2210, the schemes to multiplex HARQ-ACK 2220 and other UCI types onto PUSCH can apply to cases with other DM-RS structures as well.

In other aspects, when CP-OFDM waveform is employed for PUSCH transmission 2300, the HARQ-ACK feedback 2220 can be mapped in a distributed fashion within the allocated resource so as to exploit the benefit of frequency diversity. As such, FIG. 23 illustrates one example of frequency first mapping of HARQ-ACK feedback 2220 on PUSCH with distributed mapping in frequency.

In other embodiments, depending on specific application/service, deployment scenario and UE 400 coverage status, whether time-first or frequency-first mapping is employed for HARQ-ACK feedback 2220 on PUSCH resource can be semi-statically configured by higher layers via NR minimum system information (MSI), NR remaining minimum system information (RMSI), NR system information block (SIB) or radio resource control (RRC) signaling or dynamically indicated in the downlink control information (DCI).

As such, the UE 400 can operate in a hybrid mode for both, and whether time-first/frequency-first mapping can be used in HARQ-ACK on PUSCH can be semi-statically configured or dynamically indicated in the DL information on DCI.

Additionally or alternatively, the determination of a frequency first mapping of an NR physical control channel (e.g., PUSCH) could depend on whether CP-OFDM or DFT-s-OFDM based waveforms are employed for the transmission of PUSCH. As a further extension, whether time-first or frequency-first mapping is employed for HARQ-ACK feedback on PUSCH resource can be configured for different waveforms, or can be associated with one waveform. In one example, when CP-OFDM is employed for the transmission of PUSCH, a frequency first resource mapping for HARQ-ACK feedback 2220 on PUSCH can be used as demonstrated in FIG. 23.

FIG. 24 illustrates one example of HARQ-ACK feedback 2220 on PUSCH 2400 when HARQ-ACK feedback spans three symbols after the DM-RS symbol 2210.

In addition or alternatively, the number of subcarriers in frequency or the number of symbols used for the transmission of HARQ-ACK symbols on PUSCH may be derived from the rate-matching parameters or configured by higher layers, which can help in achieving appropriate balance between coverage improvement and the gNB 500 processing time relaxation. Thus, a number of subcarriers in frequency or a number of symbols in time can be derived from the rate-matching parameter or configured by the higher layer. Again the UE 400 can generate, and gNB 500 process, in a hybrid mode of time first or frequency first mapping, where the transmission can have two blocks and in time where k symbols are present after the DM-RS symbols 2210 and where in frequency they can be determined based on the allocated resource and the number of symbols allocated for the HARQ-ACK 2220 on PUSCH.

In other embodiments, regardless of whether a time-first or a frequency-first resource mapping is employed, HARQ-ACK feedback 2220 can be mapped in a distributed manner so as to exploit the benefit of frequency diversity, in which chunks or segments can either be repeated or mapped sequentially across time or frequency first. This is more beneficial for relatively small HARQ-ACK payload size and when a large amount of resources is allocated for data transmission. In this case, spreading the HARQ-ACK symbols in an allocated resource can help to improve the HARQ-ACK detection performance.

Figure 25:
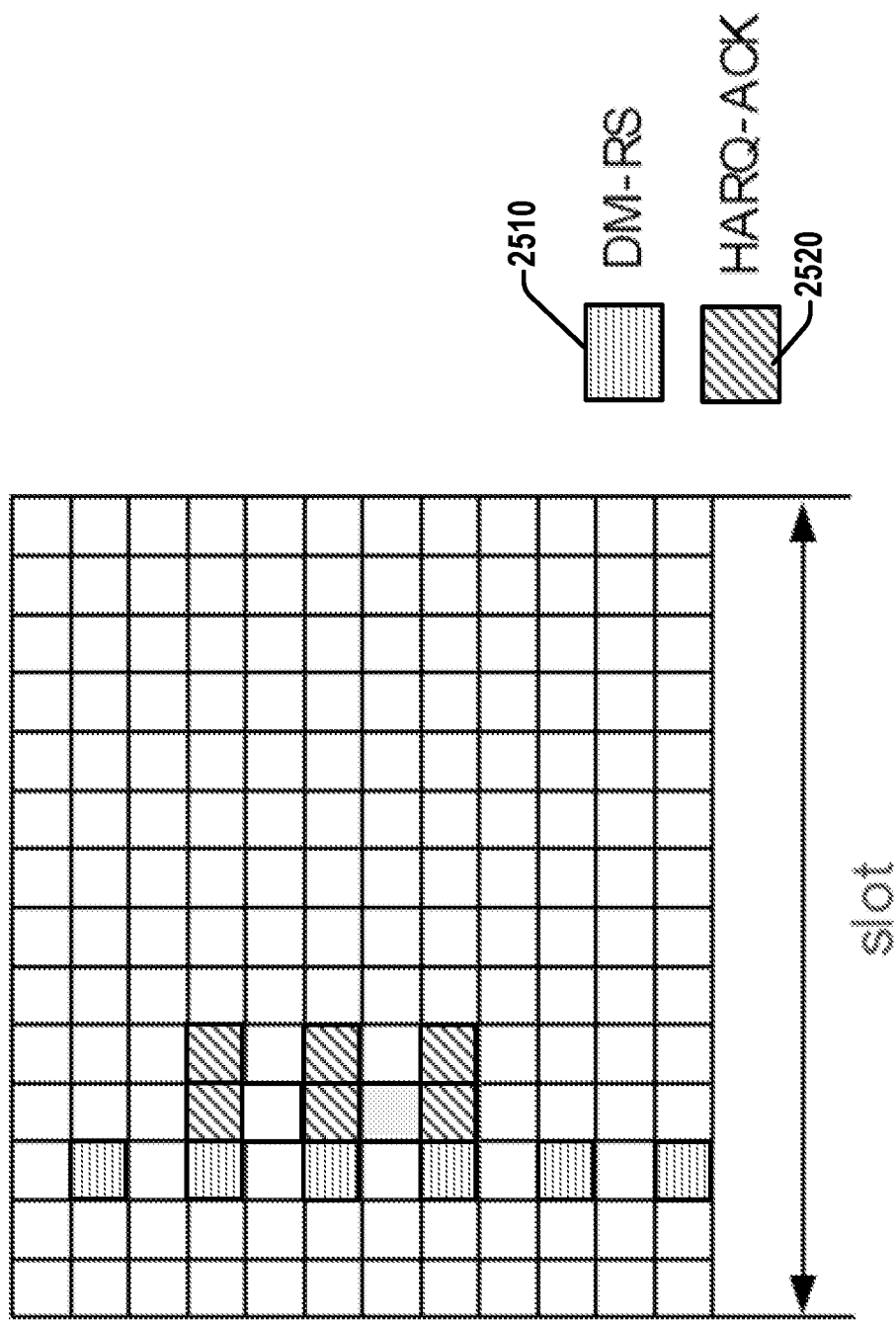
FIG. 25 illustrates HARQ-ACK feedback using a same subcarrier as DM-RS according to various aspects/embodiments described herein.

Referring to FIG. 25, illustrated is an example of HARQ-ACK feedback using the same subcarriers as DM-RS. Note that the other DM-RS pattern and HARQ-ACK multiplexing scheme can be straightforwardly extended from this example In other embodiments, for front-loaded DM-RS, different DM-RS antenna ports may be multiplexed in a frequency division multiplexing (FDM) manner. In this case, HARQ-ACK feedback 2520 may be transmitted in a same subcarrier with the associated DM-RS APs 2510 for PUSCH transmission, which can provide better channel estimation quality for HARQ-ACK feedback transmission.

As such, in an embodiment in frequency, the transmission can depend on the DM-RS antenna port. For NR, the DM-RS antenna port can have comb based DM-RS antenna port 2210, so a different offset can be assigned to different resource, like a resource element for DM-RS transmission. For example, the third symbol is DM-RS antenna port or RE for a given UE 400, for example, and in order to improve the performance, this HARQ-ACK 2520 can be transmitted in a same subcarrier where this DM-RS is located.

Figure 26:
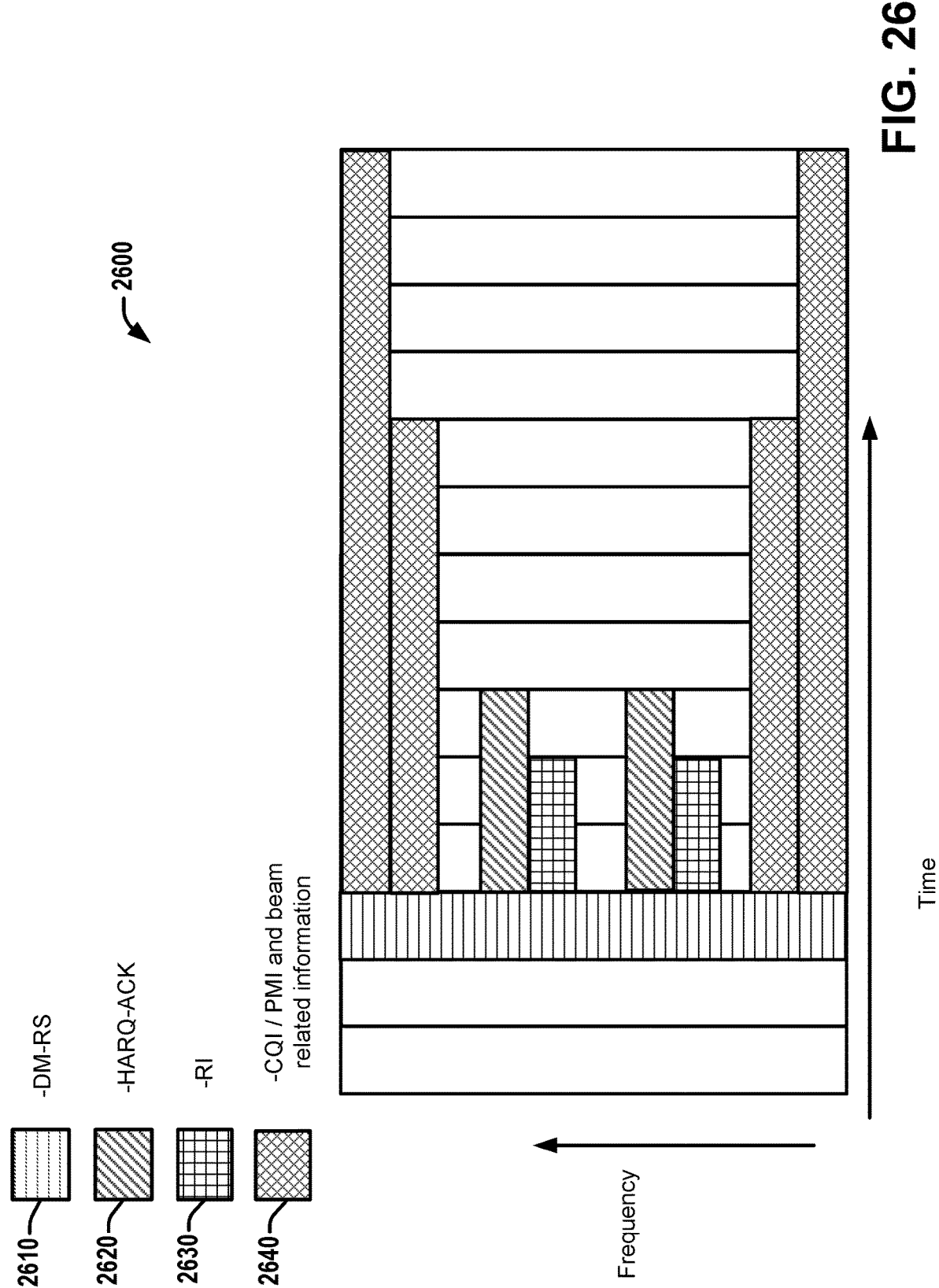
FIG. 26 illustrates a time first mapping (frequency second) for other UCI such as CQI/PMI/beam related information on PUSCH according to various aspects/embodiments described herein.
Figure 27:
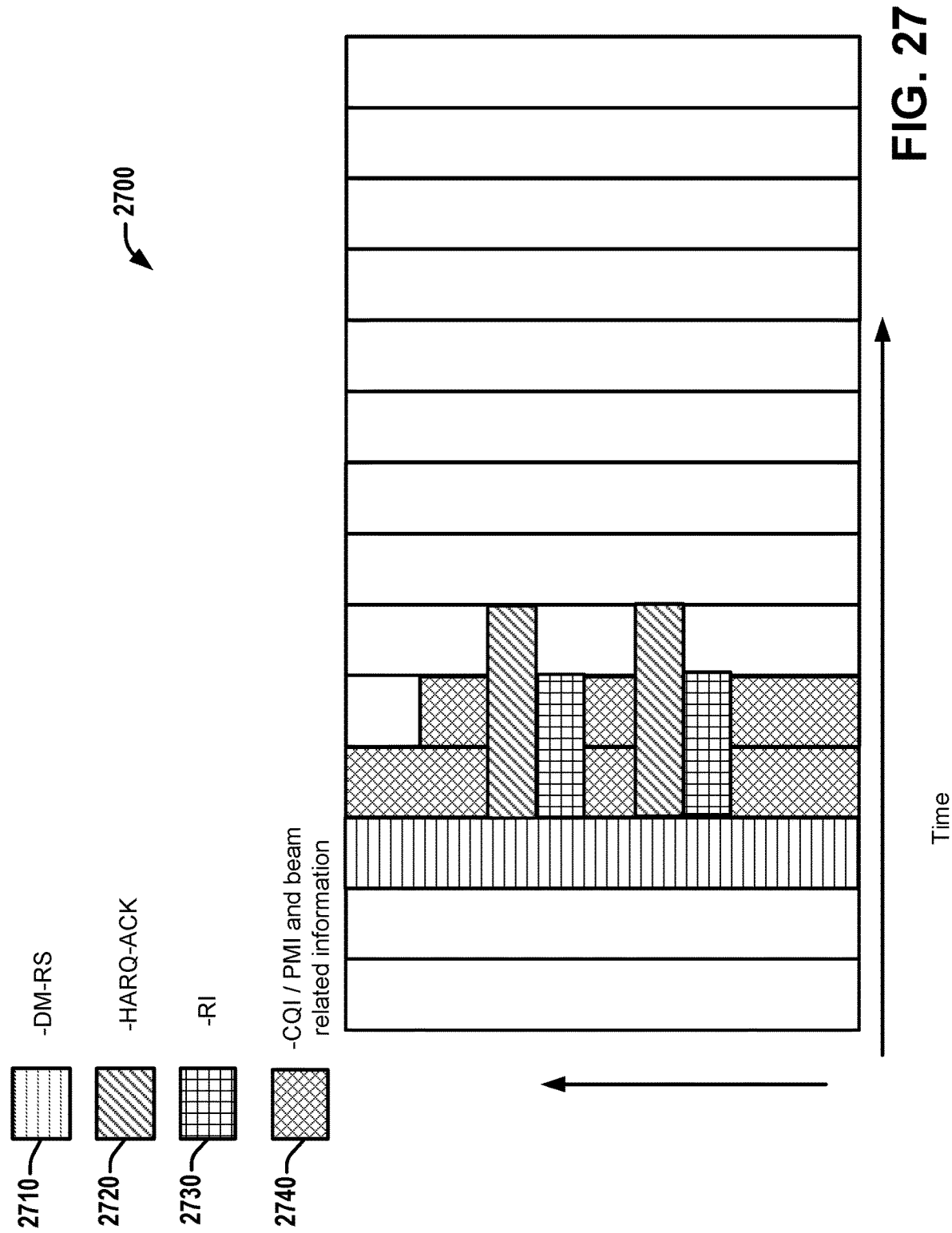
FIG. 27 illustrates a frequency first mapping (time second) for other UCI such as CQI/PMI/beam related information on PUSCH according to various aspects/embodiments described herein.

In further embodiments, various multiplexing schemes for other UCI types on PUSCH can also be generated, as demonstrated in the examples of FIGS. 26 and 27 according to various aspects described herein.

FIG. 26 illustrates an NR physical UL channel for transmission 2600 of time first mapping operations for CQI/PMI/beam related information 2640 on PUSCH. In particular, RI/CQI/PMI and beam related information 2640 can be rate matched around the other data symbols. To provide more robust performance, RI 2630 can be mapped in a similar manner as HARQ-ACK symbols 2620. Additionally, same modulation scheme as data symbols is employed for CQI/PMI and beam related information 2640.

In various embodiments, CQI/PMI and beam related information 2640 can be mapped in a time first manner. In case of bursty interference including ultra-reliable low latency communication (URLLC) puncturing enhanced mobile broadband (eMBB) data, the time-first mapping can allow the gNB 500 to successfully recover CQI/PMI and potentially beam related information 2640.

In an aspect, to further enhance the link level performance by exploiting the benefit of frequency diversity, CQI/PMI and beam related information 2640 can be mapped in both the edges of allocated resources for PUSCH as shown in FIG. 26. Although CQI/PMI and beam related information 2640 are transmitted on both edges of PUSCH resources in the example transmission 2600, they could also be configured and transmitted only on one side of the PUSCH resource, e.g., upper side of PUSCH resource, or bottom. In cases that frequency hopping is applied to the PUSCH transmission and thus the transmission transitions to a different frequency region during the slot, the embedded UCIs in FIG. 26 can be mapped with the same pattern within the frequency hopped resources.

Referring to FIG. 27, illustrated is an example of frequency first mapping for CQI/PMI and beam related information 2740 on PUSCH 2700 for NR physical UL channel transmissions. In the example, CQI/PMI and beam related information 2740 can be rate-matched around the HARQ-ACK feedback 2620 and RI 2730.

In one embodiment, CQI/PMI and beam related information can be mapped in a frequency first manner, starting from the first symbol after DM-RS symbol(s) 2710. Further, given that HARQ-ACK 2720 and RI 2730 are also transmitted in the first few symbols after DM-RS 2710, CQI/PMI and beam related information 2740 can be rate-matched around (based on) the HARQ-ACK feedback 2720 and the RI symbols 2730, which can also be dispersed or distributed along the allocated resource (e.g., distributed in frequency).

In another embodiment for above 6 GHz, phase tracking—reference signal (PT-RS) can be supported for NR transmission to allow the receiver at the gNB 500 to estimate and compensate phase noise. Further, additional DM-RS symbols may be inserted in the second part of the slot for high speed scenario. In a case when PT-RS and additional DM-RS symbols are present in the slot and when UCI is embedded on PUSCH, the UCI can be rate-matched around the PT-RS and additional DM-RS symbol. In other words, HARQ-ACK feedback 2720 would not puncture the PT-RS and additional DM-RS symbol if present.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases.

Figure 28:
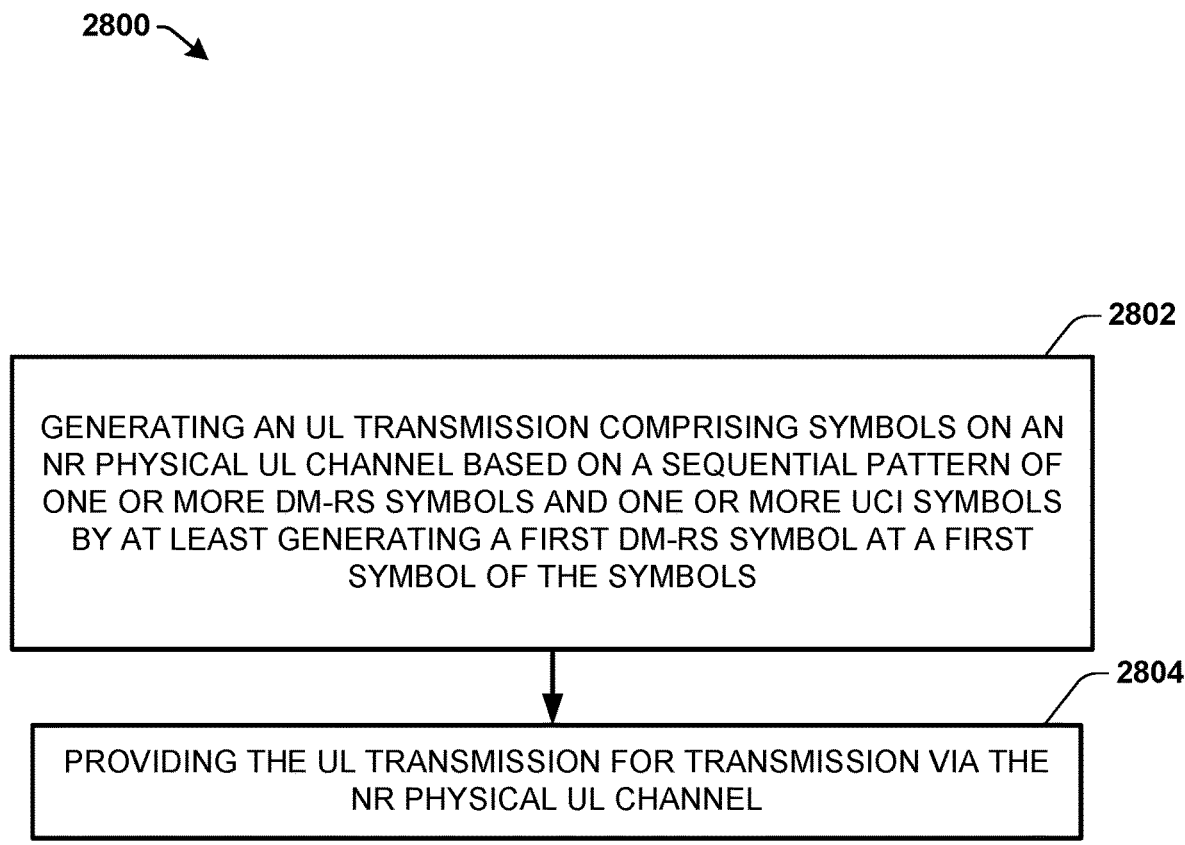
FIG. 28 illustrates an example process flow for UL communications according to various aspects/embodiments described herein.

Referring to FIG. 28, illustrated is an example process flow 2800 for an eNB/gNB, or UE for example, to perform/process/generate UL transmissions on NR physical UL channels such as PUCCH or PUSCH.

At 2802, the process flow 2800 includes generating an UL transmission comprising symbols on a NR physical UL channel based on a sequential pattern (e.g., an alternating pattern) of one or more demodulation-reference signal (DM-RS) symbols and one or more UCI symbols by at least generating a first DM-RS symbol at a first symbol of the symbols.

At 2804, the method continues with providing the UL transmission for transmission via the NR physical UL channel.

In other acts, the process flow can include generating the UL transmission based on frequency hopping from a first set of symbols on a first frequency of the UL transmission and a second set of symbols that is different from the first set of symbols on a second frequency by generating an alternating pattern as the sequential pattern that comprises alternating between a DM-RS symbol and a UCI symbol. The second set of symbols can comprises a same or more number of symbols than the set first set of symbols. Additionally, the second set can initiate with a UCI symbol, or a DM-RS symbol, at a first symbol on the second set of symbols.

The process flow 2800 further comprises mapping HARQ-ACK feedback on a PUSCH based a frequency first operation, or a time first operation, that initiates following the DM-RS symbol located at the first symbol for the UL transmission, by dispersing the HARQ-ACK feedback in segments distributed across an allocated resource.

Additionally, or alternatively, the UE 400 can operate to generate (or the gNB 500 process) an additional DM-RS symbol and a phase tracking-reference signal (PT-RS) within a same slot as the DM-RS symbol, and rate-matching a UCI around/based on the additional DM-RS symbol and the PT-RS.

Further, the UE 400 can deriving a number of subcarriers or a number of symbols corresponding to a HARQ-ACK feedback on a PUSCH based on a rate-matching parameter or a higher layer signaling comprising an RRC signaling that is generated from the gNB 500 or other network layer for example.

As used herein, the term "circuitry" can refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components including the memory. It is noted that the memory components described herein can be either volatile memory or nonvolatile memory, or can include both volatile and nonvolatile memory.

By way of illustration, and not limitation, nonvolatile memory, for example, can be included in a memory, non-volatile memory (see below), disk storage (see below), and memory storage (see below). Further, nonvolatile memory can be included in read only memory, programmable read only memory, electrically programmable read only memory, electrically erasable programmable read only memory, or flash memory. Volatile memory can include random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to include, without being limited to including, these and any other suitable types of memory.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 can be an apparatus configured to be employed in a user equipment (UE) comprising: one or more processors configured to: generate an uplink (UL) transmission comprising a plurality of orthogonal frequency-division multiplexing (OFDM) symbols on a new radio (NR) physical UL channel based on a sequential pattern that comprises an alternating pattern with one or more demodulation-reference signal (DM-RS) symbols and one or more uplink control information (UCI) symbols, wherein the UL transmission further comprises a DM-RS symbol located at a first OFDM symbol of the plurality of OFDM symbols; and a radio frequency (RF) interface, configured to send, to RF circuitry, data for the UL transmission.

Example 2 can include Example 1, wherein the one or more processors are further configured to: generate the UL transmission based on about a 50% or greater DM-RS overhead based on a same or more number of DM-RS symbols than UCI symbols of the UL transmission on the NR physical UL channel.

Example 3 can include the subject matter of any one of Examples 1-2, wherein the one or more processors are further configured to: transmit the UL transmission with a frequency hopping operation based on an OFDM symbol set on a first frequency and an OFDM symbol set on a second frequency of the UL transmission that is different from the OFDM symbol set on the first frequency of the UL transmission.

Example 4 can include the subject matter of any one of Examples 1-3, wherein the OFDM symbol set on the second frequency of the UL transmission comprises a same or more number of OFDM symbols than the OFDM symbol set on the first frequency, and wherein the sequential pattern of both sets comprises an alternating pattern that alternates between a DM-RS symbol and a UCI symbol, respectively.

Example 5 can include the subject matter of any one of Examples 1-4, wherein the OFDM symbol set on the second frequency of the UL transmission initiates with a UCI symbol or a DM-RS symbol.

Example 6 can include the subject matter of any one of Examples 1-5, wherein the one or more processors are further configured to: alter a length of a long NR physical UL control channel (NR PUCCH) on the NR physical UL channel based on a dynamic change of an indication received on a DL scheduling information of a physical downlink control channel (PDCCH), wherein the NR PUCCH is configured to vary in duration among UL transmissions based on the dynamic change of the indication.

Example 7 can include the subject matter of any one of Examples 1-6, wherein the one or more processors are further configured to: configure the long NR PUCCH to dynamically change among UL transmissions from about four OFDM symbols to about fourteen OFDM symbols of the plurality of OFDM symbols based on the indication.

Example 8 can include the subject matter of any one of Examples 1-7, wherein the one or more processors are further configured to: generate the alternating pattern in the UL transmission that alternatives between a DM-RS symbol and a UCI symbol across the plurality of OFDM symbols comprising the one or more DM-RS symbols and the one or more UCI symbols.

Example 9 can include the subject matter of any one of Examples 1-8, wherein the one or more processors are further configured to: increase a duration of the UL transmission with respect to a previous UL transmission in response to an indication received via a radio resource control (RRC) or a downlink control information (DCI) on a physical downlink control channel (PDCCH).

Example 10 can include the subject matter of any one of Examples 1-9, wherein the NR physical UL control channel comprises a long NR PUCCH configured based on a variable duration.

Example 11 can include the subject matter of any one of Examples 1-10, wherein the one or more processors are further configured to: map hybrid automatic repeat request-acknowledgement (HARQ-ACK) feedback on a PUSCH based a frequency first operation that initiates following the DM-RS symbol located at the first OFDM symbol of the plurality of symbols for the UL transmission, by dispersing the HARQ-ACK feedback in segments distributed across a frequency allocated resource.

Example 12 can include the subject matter of any one of Examples 1-11, wherein the one or more processors are further configured to: receive, via a at least one of: an NR minimum system information (MSI), an NR remaining minimum system information (RMSI), an NR system information block (SIB), an RRC, or a downlink control information (DCI), an indication of a mapping operation for HARQ-ACK feedback that indicates whether to map the HARQ-ACK feedback in the UL transmission initially with a frequency first operation or a time first operation; and map the HARQ-ACK feedback on a PUSCH with the frequency first operation or the time first operation based on the indication.

Example 13 can include the subject matter of any one of Examples 1-12, wherein the one or more processors are further configured to: multiplex DM-RS antenna ports with HARQ-ACK feedback to transmit the HARQ-ACK feedback in a same subcarrier as the associated DM-RS antenna ports.

Example 14 can include the subject matter of any one of Examples 1-13, wherein the one or more processors are further configured to: generate at least one of: a rank indicator (RI), a channel quality indicator (CQI), a pre-coding matrix indicator (PMI), or a beam related information at one or both edges of a PUSCH frequency resource by a time first mapping operation; or generate the at least one of: the rank indicator (RI), the channel quality indicator (CQI), the pre-coding matrix indicator (PMI), or the beam related information by a frequency first mapping and a rate-matching adjacent to HARQ-ACK feedback and RI symbols on PUSCH.

Example 15 can include the subject matter of any one of Examples 1-15, wherein the one or more processors are further configured to: generate an additional DM-RS symbol and a phase tracking-reference signal (PT-RS) within a same slot as the DM-RS symbol, and rate-matching a UCI symbol around the additional DM-RS symbol and the PT-RS.

Example 16 can be a computer-readable storage medium storing executable instructions that, in response to execution, cause one or more processors of a user equipment (UE) to perform operations, comprising: generating an uplink (UL) transmission comprising symbols on a new radio (NR) physical UL channel based on a sequential pattern of one or more demodulation-reference signal (DM-RS) symbols and one or more uplink control information (UCI) symbols by at least generating a first DM-RS symbol at a first symbol of the symbols; and providing the UL transmission for transmission via the NR physical UL channel.

Example 17 can include the subject matter of Examples 16, wherein the operations further comprise: generating the UL transmission based on frequency hopping from a first set of symbols on a first frequency of the UL transmission and a second set of symbols that is different from the first set of symbols on a second frequency by generating an alternating pattern as the sequential pattern that comprises alternating between a DM-RS symbol and a UCI symbol; wherein the second set of symbols comprises a same or more number of symbols than the set first set of symbols, and wherein the second set initiates with a UCI symbol, or a DM-RS symbol, at a first symbol on the second set of symbols.

Example 18 can include the subject matter of any one of Examples 16-17, wherein the operations further comprise: mapping hybrid automatic repeat request-acknowledgement (HARQ-ACK) feedback on a PUSCH based a frequency first operation, or a time first operation, that initiates following the DM-RS symbol located at the first symbol for the UL transmission, by dispersing the HARQ-ACK feedback in segments distributed across an allocated resource.

Example 19 can include the subject matter of any one of Examples 16-18, wherein the operations further comprise: generating an additional DM-RS symbol and a phase tracking-reference signal (PT-RS) within a same slot as the DM-RS symbol, and rate-matching a UCI around the additional DM-RS symbol and the PT-RS.

Example 20 can include the subject matter of any one of Examples 16-19, wherein the operations further comprise: deriving a number of subcarriers or a number of symbols corresponding to a HARQ-ACK feedback on a PUSCH based on a rate-matching parameter or a higher layer signaling comprising an RRC signaling.

Example 21 is an apparatus configured to be employed in a next generation NodeB (gNB) comprising: one or more processors configured to: process an uplink (UL) transmission comprising orthogonal frequency-division multiplexing (OFDM) symbols on a new radio (NR) physical UL channel based on a pattern including one or more demodulation-reference signal (DM-RS) symbols and one or more uplink control information (UCI) symbols, wherein the UL transmission further comprises a DM-RS symbol located at a first OFDM symbol of the OFDM symbols; and a radio frequency (RF) interface, configured to provide, to RF circuitry, data for the UL transmission on the NR physical UL channel.

Example 22 can include the subject matter of Example 21, wherein the one or more processors are further configured to: process the UL transmission according to a frequency hopping operation based on an OFDM symbol set on a first frequency and an OFDM symbol set on a second frequency of the UL transmission, wherein the OFDM symbol set on the first frequency and the OFDM symbol set on the second frequency comprise seven OFDM symbols, respectively, with an alternating pattern that alternates sequentially between a DM-RS symbol and a UCI symbol, and wherein the OFDM symbol set on the second frequency of the UL transmission initiates with a UCI symbol.

Example 23 can include the subject matter of any one of Examples 21-22, wherein the one or more processors are further configured to: provide, via a DL scheduling information or a downlink control information (DCI) on a physical downlink control channel (PDCCH), an indication of a length of a long NR PUCCH to dynamically enable a variation in the length based on one or more criteria.

Example 24 can include the subject matter of any one of Examples 21-23, wherein the one or more processors are further configured to: process hybrid automatic repeat request-acknowledgement (HARQ-ACK) feedback on a PUSCH based a frequency first mapping that initiates following the DM-RS symbol located at the first OFDM symbol of the symbols for the UL transmission, wherein the HARQ-ACK feedback is dispersed in segments distributed discontinuously across a frequency.

Example 25 can include the subject matter of any one of Examples 21-24, wherein the one or more processors are further configured to: process an additional DM-RS symbol and a phase tracking-reference signal (PT-RS) within a same slot, wherein a UCI symbol is rate-matched based on the additional DM-RS symbol and the PT-RS.

Example 26 can include an apparatus comprising means to perform one or more elements of a method described in or related to any of examples 1-25, or any other method or process described herein.

Example 27 can include one or more non-transitory computer-readable media comprising instructions to cause an electronic device, upon execution of the instructions by one or more processors of the electronic device, to perform one or more elements of a method described in or related to any of examples 1-25, or any other method or process described herein.

Example 28 can include an apparatus comprising logic, modules, or circuitry to perform one or more elements of a method described in or related to any of examples 1-25, or any other method or process described herein.

Example 29 can include a method, technique, or process as described in or related to any of examples 1-25, or portions or parts thereof.

Example 30 can include an apparatus comprising: one or more processors and one or more computer readable media comprising instructions that, when executed by the one or more processors, cause the one or more processors to perform the method, techniques, or process as described in or related to any of examples 1-25, or portions thereof.

Example 31 can include a method of communicating in a wireless network as shown and described herein.

Example 32 can include a system for providing wireless communication as shown and described herein.

Example 33 can include a device for providing wireless communication as shown and described herein.

It is to be understood that aspects described herein can be implemented by hardware, software, firmware, or any combination thereof. When implemented in software, functions can be stored on or transmitted over as one or more instructions or code on a computer-readable medium. Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. An apparatus configured to be employed in a user equipment (UE) comprising:
    one or more processors configured to:
        generate an uplink (UL) transmission comprising a plurality of orthogonal frequency-division multiplexing (OFDM) symbols on a new radio (NR) physical UL channel based on a sequential pattern of at least two different symbol building block configurations, where a first building block has two symbols comprising a first demodulation-reference signal (DM-RS) symbol followed by a second uplink control information (UCI) symbol, and a second building block has three symbols comprising a first DM-RS symbol followed by a second UCI symbol and then a third DM-RS symbol,
    wherein the generated UL transmission contains a greater than 50% DM-RS overhead based on a greater number of DM-RS symbols than UCI symbols of the UL transmission on the NR physical UL channel; and
    a radio frequency (RF) interface, configured to send, to RF circuitry, data for the UL transmission.

2. The apparatus of claim 1, wherein the one or more processors are further configured to:
    transmit the UL transmission with a frequency hopping operation based on an OFDM symbol set based on the sequential pattern of at least one of the at least two different symbol building block configurations on a first frequency and an OFDM symbol set based on the sequential pattern of at least one of the at least two different symbol building block configurations on a second frequency of the UL transmission that is different from the OFDM symbol set on the first frequency of the UL transmission.

3. The apparatus of claim 2, wherein the OFDM symbol set on the second frequency of the UL transmission comprises a same or more number of OFDM symbols than the OFDM symbol set on the first frequency.

4. The apparatus of claim 3, wherein the OFDM symbol set on the second frequency of the UL transmission initiates with a UCI symbol or a DM-RS symbol.

5. The apparatus of claim 1, wherein the one or more processors are further configured to:
    alter a length of a long NR physical UL control channel (NR PUCCH) on the NR physical UL channel based on a dynamic change of an indication received on a DL scheduling information of a physical downlink control channel (PDCCH), wherein the NR PUCCH is configured to vary in duration among UL transmissions based on the dynamic change of the indication.

6. The apparatus of claim 5, wherein the one or more processors are further configured to:
    configure the long NR PUCCH to dynamically change among UL transmissions from about four OFDM symbols to about fourteen OFDM symbols of the plurality of OFDM symbols based on the indication.

7. The apparatus of claim 1, wherein the one or more processors are further configured to:
    increase a duration of the UL transmission with respect to a previous UL transmission in response to an indication received via a radio resource control (RRC) or a downlink control information (DCI) on a physical downlink control channel (PDCCH).

8. The apparatus of claim 1, wherein the NR physical UL channel comprises a long NR PUCCH configured based on a variable duration.

9. The apparatus of claim 1, wherein the one or more processors are further configured to:
    map hybrid automatic repeat request-acknowledgement (HARQ-ACK) feedback on a PUSCH based on a frequency first operation that initiates following the first DM-RS symbol located at a first OFDM symbol of the plurality of OFDM symbols for the UL transmission, by dispersing the HARQ-ACK feedback in segments distributed across a frequency allocated resource.

10. The apparatus of claim 1, wherein the one or more processors are further configured to:
    receive, via a at least one of: an NR minimum system information (MSI), an NR remaining minimum system information (RMSI), an NR system information block (SIB), an RRC, or a downlink control information (DCI), an indication of a mapping operation for HARQ-ACK feedback that indicates whether to map the HARQ-ACK feedback in the UL transmission initially with a frequency first operation or a time first operation; and
    map the HARQ-ACK feedback on a PUSCH with the frequency first operation or the time first operation based on the indication.

11. The apparatus of claim 1, wherein the one or more processors are further configured to:
    multiplex DM-RS antenna ports with HARQ-ACK feedback to transmit the HARQ-ACK feedback in a same subcarrier as the associated DM-RS antenna ports.

12. The apparatus of claim 1, wherein the one or more processors are further configured to:
    generate at least one of: a rank indicator (RI), a channel quality indicator (CQI), a pre-coding matrix indicator (PMI), or a beam related information at one or both edges of a PUSCH frequency resource by a time first mapping operation; or
    generate the at least one of: the rank indicator (RI), the channel quality indicator (CQI), the pre-coding matrix indicator (PMI), or the beam related information by a frequency first mapping and a rate-matching adjacent to HARQ-ACK feedback and RI symbols on PUSCH.

13. The apparatus of claim 1, wherein the one or more processors are further configured to:
generate an additional DM-RS symbol and a phase tracking-reference signal (PT-RS) within a same slot as the DM-RS symbol, and rate-matching a UCI symbol around the additional DM-RS symbol and the PT-RS.

14. A non-transitory computer-readable storage medium storing executable instructions that, in response to execution, cause one or more processors of a user equipment (UE) to perform operations, comprising:
generating an uplink (UL) transmission comprising symbols on a new radio (NR) physical UL channel based on a sequential pattern of at least two different symbol building block configurations, where a first building block has two symbols comprising a first demodulation-reference signal (DM-RS) symbol followed by a second uplink control information (UCI) symbol, and a second building block comprises a first DM-RS symbol followed by either a second UCI symbol and then a third DM-RS symbol, or two UCI symbols,
wherein the generated UL transmission contains a greater than 50% DM-RS overhead based on a greater number of DM-RS symbols than UCI symbols of the UL transmission on the NR physical UL channel; and
providing the UL transmission for transmission via the NR physical UL channel.

15. The non-transitory computer-readable storage medium of claim 14, wherein the operations further comprise:
generating the UL transmission based on frequency hopping from a first set of symbols on a first frequency of the UL transmission and a second set of symbols that is different from the first set of symbols on a second frequency by generating an alternating pattern as the sequential pattern that comprises alternating between a DM-RS symbol and a UCI symbol;
wherein the second set of symbols comprises a same or more number of symbols than the first set of symbols, and wherein the second set of symbols initiates with a UCI symbol, or a DM-RS symbol, at a first symbol on the second set of symbols.

16. The non-transitory computer-readable storage medium of claim 14, wherein the operations further comprise:
mapping hybrid automatic repeat request-acknowledgement (HARQ-ACK) feedback on a PUSCH based on a frequency first operation, or a time first operation, that initiates following the first DM-RS symbol located at a first symbol for the UL transmission, by dispersing the HARQ-ACK feedback in segments distributed across an allocated resource.

17. The non-transitory computer-readable storage medium of claim 14, wherein the operations further comprise:
generating an additional DM-RS symbol and a phase tracking-reference signal (PT-RS) within a same slot as the first DM-RS symbol, and rate-matching a UCI around the additional DM-RS symbol and the PT-RS.

18. The non-transitory computer-readable storage medium of claim 14, wherein the operations further comprise:
deriving a number of subcarriers or a number of symbols corresponding to a HARQ-ACK feedback on a PUSCH based on a rate-matching parameter or a higher layer signaling comprising an RRC signaling.

19. An apparatus configured to be employed in a base station comprising:
one or more processors configured to:
process an uplink (UL) transmission comprising orthogonal frequency-division multiplexing (OFDM) symbols on a new radio (NR) physical UL channel based on a pattern including at least two different symbol building block configurations, where a first building block has two symbols comprising a first demodulation-reference signal (DM-RS) symbol followed by a second uplink control information (UCI) symbol, and a second building block comprises a first DM-RS symbol followed by either a second UCI symbol and then a third DM-RS symbol, or two UCI symbols,
wherein the generated UL transmission contains a greater than 50% DM-RS overhead based on a greater number of DM-RS symbols than UCI symbols of the UL transmission on the NR physical UL channel; and
a radio frequency (RF) interface, configured to receive, from RF circuitry, data from the UL transmission on the NR physical UL channel.

20. The apparatus of claim 19, wherein the one or more processors are further configured to:
process the UL transmission according to a frequency hopping operation based on an OFDM symbol set on a first frequency and an OFDM symbol set on a second frequency of the UL transmission, wherein the OFDM symbol set on the first frequency and the OFDM symbol set on the second frequency comprise seven OFDM symbols, respectively, with an alternating pattern that alternates sequentially between a DM-RS symbol and a UCI symbol, and wherein the OFDM symbol set on the second frequency of the UL transmission initiates with a UCI symbol.

21. The apparatus of claim 19, wherein the one or more processors are further configured to:
provide, via a DL scheduling information or a downlink control information (DCI) on a physical downlink control channel (PDCCH), an indication of a length of a long NR PUCCH to dynamically enable a variation in the length based on one or more criteria.

22. The apparatus of claim 19, wherein the one or more processors are further configured to:
process hybrid automatic repeat request-acknowledgement (HARQ-ACK) feedback on a PUSCH based on a frequency first mapping that initiates following the first DM-RS symbol located at a first OFDM symbol of the OFDM symbols for the UL transmission, wherein the HARQ-ACK feedback is dispersed in segments distributed discontinuously across a frequency.

23. The apparatus of claim 19, wherein the one or more processors are further configured to:
process an additional DM-RS symbol and a phase tracking-reference signal (PT-RS) within a same slot, wherein a UCI symbol is rate-matched based on the additional DM-RS symbol and the PT-RS.

* * * * *